(12) United States Patent
Dohi

(10) Patent No.: US 6,757,062 B2
(45) Date of Patent: Jun. 29, 2004

(54) METHOD AND DEVICE FOR MEASURING THICKNESS OF LIQUID CRYSTAL LAYER

(75) Inventor: Atsushi Dohi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 226 days.

(21) Appl. No.: 09/772,325

(22) Filed: Jan. 29, 2001

(65) Prior Publication Data

US 2001/0050771 A1 Dec. 13, 2001

(30) Foreign Application Priority Data

Jan. 31, 2000 (JP) .......................................... 2000-022219
Dec. 22, 2000 (JP) .......................................... 2000-390545

(51) Int. Cl.$^7$ ............................ G01J 4/00; G01B 11/28
(52) U.S. Cl. ............................................ 356/364; 356/630
(58) Field of Search ................................. 356/364, 365, 356/369, 445, 446, 630, 632, 635; 250/225, 559.27, 559.24

(56) References Cited

U.S. PATENT DOCUMENTS 6,081,337 A * 6/2000 Kwok et al. ................. 356/601
6,233,030 B1 * 5/2001 Oh-Ide et al. ................. 349/99
6,266,113 B1 * 7/2001 Yamazaki et al. .......... 349/115

FOREIGN PATENT DOCUMENTS

JP 4-307312 10/1992
JP 10-232113 9/1998

* cited by examiner

Primary Examiner—Zandra V. Smith
Assistant Examiner—Gordon J. Stock, Jr.
(74) Attorney, Agent, or Firm—David G. Conlin; Peter J. Manus; Edwards & Angell, LLP

(57) ABSTRACT

According to a method of measuring a thickness, to measure a thickness d of a liquid crystal layer 11, a property of reflected light is utilized, in that the light returns maintaining the same polarizing plane as that of an entrance when a polarizing plane-maintaining condition is satisfied in which a difference in optical path lengths between an ordinary ray and an extraordinary ray of the reflected light is a sum of an integer multiple of the wavelength and a half-wavelength or an integer multiple, to find a wavelength at which the polarizing plane-maintaining condition is satisfied. A reasonable $\Delta n \cdot d$ is thereby found. This is performed for a plurality of wavelengths to find a relational expression of a wavelength and $\Delta n \cdot d$. A known combination of a wavelength $\lambda$ and $\Delta n$ is assigned to the relational expression to find d.

32 Claims, 11 Drawing Sheets

METHOD AND DEVICE FOR MEASURING THICKNESS OF LIQUID CRYSTAL LAYER

BACKGROUND OF THE INVENTION

1. Field of the Invention

The present invention relates to a method and a device for measuring a thickness of a birefringent body having a birefringent index $\Delta n$ that is uniform in the thickness direction, such as an alignment-treated liquid crystal layer included in a liquid crystal display element.

2. Description of the Background Art

Liquid crystal display elements are utilized as displays in significantly wide-ranging areas, since they have small power consumption and small size, and are lightweight. In recent years, color liquid crystal display elements of a reflection-type have, among others, come into practical use, and the demand therefor has rapidly expanded.

A reflection-type color liquid crystal display, a conventional reflection-type liquid crystal display and a conventional transmission-type liquid crystal display are herein described for their respective characteristics. A conventional transmission-type liquid crystal display 111 includes, as shown in FIG. 20, a liquid crystal cell 100 constituted by a pair of transparent substrates 12 with outer sides interposed by polarizing plates 14 or elliptical polarizing plates. A voltage applied to a liquid crystal layer 11 changes an alignment of liquid crystal molecules and controls an polarization state of light transmitting through the liquid crystal layer. The light transmits through polarizing plate 14 of an exit side, with the controlled polarization state, so that a difference in brightness is generated in accordance with the polarization state, resulting in a desired display. Further, a conventional transmission-type liquid crystal display 112 also uses, as shown in FIG. 21, liquid crystal cell 100 which is basically the same as that of the transmission-type, and a reflector 15 is further attached to an outer side of polarizing plate 14 of a backside, for displaying.

However, along with finer picture elements attained in recent years, a conventional method in which reflector 15 is attached to the outside for displaying on conventional reflection-type liquid crystal display 112 have caused a problem in that an image is doubled due to a parallax generated by the thickness of substrate 12 and polarizing plate 14 between reflector 15 and liquid crystal layer 11. Particularly when it comes to a color display, the doubled image causes color mixture, which significantly lowers a display quality. Further, when the color display is performed using a micro color filter, light entered at an angle passes through color filters of different colors at an incoming side and an outgoing side, lowering color saturation and thereby greatly degrading color reproduction property.

To solve this problem, a configuration is proposed, as shown in FIG. 22, in which reflector 15 is disposed within liquid crystal cell 101. Because this configuration can suppress the doubled image due to the parallax and degrading of the color reproduction, reflection-type color liquid crystal display 113 mainly uses such a configuration in which a reflector is disposed within liquid crystal cell 101. In reflection-type color liquid crystal display 113, light is reflected by reflector 15 within liquid crystal cell 101, which is different from conventional reflection-type liquid crystal display 112 in which light transmitted through liquid crystal cell 100 is reflected after it completely exits from the liquid crystal cell.

Further, in reflection-type liquid crystal displays 112 and 113, light passes through the same liquid crystal layer 11 twice, so that the thickness of liquid crystal layer 11 has greater effects on the display quality, compared to that of a transmission-type liquid crystal display. This is because a magnitude of a change provided by a member having birefringence to the polarization state of the light entered thereto is proportional to the birefringent index (also referred to as "refractive index anisotropy") and the thickness of the member.

Thus, measurement of the thickness of liquid crystal layer 11, i.e. a so-called "cell gap," for measuring the thickness and uniformity has more significant meaning than the case with the conventional transmission-type liquid crystal display, in order to maintain the display quality of the reflection-type color liquid crystal display.

A conventional technology for measuring a thickness of a liquid crystal layer (hereinafter referred to as "cell gap") is a measurement method disclosed in Japanese Patent Laid-Open No. 4-307312 (hereinafter referred to as "conventional method 1"). In the conventional method 1, light enters into a liquid crystal cell via a polarizer arranged in a direction which is +45° rotated from an allignment direction of an entrance light side of the liquid crystal cell. Further, exit light transmitted through the liquid crystal cell exits via a polarizer arranged in a direction which is +45° rotated from an alignment direction of an exit light side of the liquid crystal cell, to measure an intensity of the exit light. An operation is performed from a value of a wavelength at which the measured exit light intensity assumes a maximal value or a minimal value, to find a value of a cell gap. In the conventional method 1, the operation is performed using $$\Delta n \cdot d = \lambda_o \cdot (m_o^2 - \Theta^2/\pi^2)^{1/2}$$

as a condition of the maximal intensity, and $$\Delta n \cdot d = \lambda_o ((m_o - \tfrac{1}{2})^2 - \Theta^2/\pi^2)^{1/2}$$

as a condition of the minimal intensity. The respective variables represent the values below.

$\Delta n$: birefringent index ($\Delta n$=extra ordinary index $n_e$–ordinary index $n_o$)

$\lambda_o$: wavelength to be maximum or minimum $m_o$: degree $\Theta$: twist angle of the liquid crystal layer An example of a conventional technology for measuring the cell gap by utilizing reflected light is a measurement method disclosed in Japanese Patent Laid-Open No. 10-232113 (hereinafter referred to as "conventional method 2"). In the conventional method 2, mercury lamp light is projected on a substrate to fluorescence-excite alignment films for liquid crystal alignment formed at inner sides of upper and lower substrates, and images are formed for the radiance on a CCD (Charge-Coupled Device) by a lens to measure the cell gap by calculating a distance between the alignment films of the upper and lower substrates from the distance between the images.

The conditional equations by which the exit light intensity is maximum or minimum, used in the conventional method 1, are the equations used only for the transmission-type liquid crystal cell. That is, it is assumed that the entered light passes through the liquid crystal layer only once during which the light is polarized. In the reflection-type liquid crystal cell, however, the light passed through the liquid crystal layer and was polarized is reflected at the reflector, and again passes through the liquid crystal layer for further polarization before exiting. Therefore, the operation for the conventional method 1 cannot be applied, as it is, to the reflection-type liquid crystal cell.

Further, there may be a reflection-type color liquid crystal display, in which a portion of the reflector not used for display, for example, a portion corresponding to a gap between electrodes, is removed by etching or the like. In such a case, the measurement of the cell gap appears to be possible by the conventional method 1, by utilizing transmitted light leaking from the portion where a reflection layer is removed. However, etching of the reflector generates a step in the liquid crystal layer between an etched portion and a nonetched portion, resulting in a possible value difference between the etched portion and a picture element portion used for display. Thus, there is a need, after all, for measuring the cell gap of the picture element portion. Thus, it is required to use the reflection light rather than the transmission light to measure the cell gap.

The conventional method 2 in which the cell gap is measured by using the reflected light is described in Japanese Patent Laid-Open No. 10-232113, such that a liquid crystal cell to which liquid crystal is not yet injected is particularly to be measured. The conventional method 2 forms an image of fluorescence generated from an alignment agent on a CCD sensor, assuming that no liquid crystal exists within the liquid crystal cell, so that the cell gap cannot be measured after the injection of the liquid crystal cell.

However, the cell gap is greatly changed after the injection to the liquid crystal cell, depending on temperature at the time of injection, leaving time after completion of injection, viscosity of liquid crystal, and amount of dispersion of a spacer placed in a gap of substrates and its particle diameter. Therefore, the cell gap measurement only for the non-injected liquid crystal cell cannot perform sufficient quality control of the liquid crystal cell. It is essentially desirable to control the cell gap after liquid crystal injection in order to control the quality of the liquid crystal cell.

Thus, an object of the present invention is to provide a method and a device for measuring a thickness of a birefringent body having a birefringent index $\Delta n$ which is uniform in the thickness direction, such as an alignment treated liquid crystal layer, using reflected light rather than transmitted light.

SUMMARY OF THE INVENTION

To achieve the object described above, according to an aspect of the present invention, a method of measuring a thickness d of a liquid crystal layer having alignment-treated upper and lower surfaces and a birefringent index $\Delta n$ which is uniform in the thickness direction, in a reflection-type liquid crystal display element including the liquid crystal layer between a pair of substrates and having a reflection region at least in a part of one of the substrates, includes a light-receiving step of entering light from a light source into the liquid crystal layer via a first polarizing means and receiving, via a second polarizing means, reflected light exited from the liquid crystal layer by reflecting at the reflection region; a dispersing step of spectrally resolving the reflected light received by the light-receiving means to detect a relation between a wavelength $\lambda$ and a reflected light intensity; a wavelength deriving step of finding a wavelength satisfying a polarizing plane-maintaining condition in that the reflected light returns maintaining a same polarizing plane as a polarizing plane at the time of the entering, i.e., that a difference in optical path lengths between an ordinary ray and an extraordinary ray of the reflected light is a sum of an integer multiple of a wavelength and a half-wavelength, or an integer multiple of a wavelength; $\Delta n \cdot d$ deriving step of finding a reasonable $\Delta n \cdot d$ from the wavelength found by the wavelength deriving step and a known twist angle of the liquid crystal layer to find a relation between the wavelength and $\Delta n \cdot d$ from a plurality of combinations of the wavelength and $\Delta n \cdot d$; and a thickness deriving step of finding d by assigning a known combination of wavelength $\lambda$ and $\Delta n$ to the relation.

By using the steps described above, the reflected light is utilized rather than transmitted light, so that an accurate measurement can also be performed for a reflection-type liquid crystal cell, irrespective of presence/absence of the transmitted light. Further, the steps are for detecting a change of the polarization state and no imaging of the reflected light is required, so that the thickness measurement can be performed irrespective of the property of the reflection region, such as being specular and diffusible.

Preferably, the wavelength deriving step is performed by finding a value of a wavelength at which the reflected light intensity assumes an extreme value. By using the step, the wavelength that satisfies the polarizing plane-maintaining condition can easily be found from a spectrum, and thus the measurement can readily be performed.

More preferably, a Jones matrix is used in the $\Delta n \cdot d$ deriving step. By employing this step, the variation of the polarization state can be expressed only by applying a mechanical calculation, and thus the operation for obtaining thickness d can be simplified.

More preferably, in the case that $\beta/\pi$ is n or n+½ (n is an integer) and $\alpha = \Delta n \cdot d \pi / \Theta \lambda$ ... (equation 1) and $\beta = \Theta \cdot (1+\alpha^2)^{1/2}$ ... (equation 2) in which $\Theta$ is a known twist angle of the liquid crystal layer, a reasonable value of $\beta/\pi$ is found from wavelength $\lambda$ when a polarizing plane of the reflected light is maintained, the twist angle $\Theta$, and the equations 1 and 2, and a relation between the wavelength and $\Delta n \cdot d$ is found by a calculation from the obtained value of $\beta/\pi$.

By employing the steps described above, unreasonable values of $\beta/\pi$ are eliminated, such that an approximation representing the most reasonable relation between the wavelength and $\Delta n \cdot d$ can be found.

Preferably, a transmission axis of the first polarizing means and a transmission axis of the second polarizing means are orthogonal to each other. By using this step, the spectrum of the exit light will be a minimal value of 0 at the wavelength satisfying the polarizing plane-maintaining condition, which facilitates finding of the wavelength.

Preferably, a transmission axis of the first polarizing means and a transmission axis of the second polarizing means are parallel to each other. By using this step, the spectrum of the exit light will be a maximal value at the wavelength satisfying the polarizing plane-maintaining condition, which facilitates finding of the wavelength.

Preferably, when an angle formed by the transmission axis of the first polarizing means and a direction of alignment on a plane of the liquid crystal layer contacting a substrate to which the light enters is assumed to be $\phi$, the light-receiving step, the dispersing step and the wavelength deriving step are performed for a plurality of $\phi$s in a range of 0° to 90°. By employing these steps, the values of $\beta\pi$ can be obtained for a plurality of wavelengths $\lambda$ by a plurality of $\phi$s, and thus the measurement can accurately be performed.

Preferably, a Cauchy dispersion formula is used in the $\Delta n \cdot d$ deriving step. By using this step, an approximation of wavelength $\lambda$ and $\Delta n \cdot d$ can be obtained even for the measurement only for one $\phi$, and thus the thickness measurement can be simplified.

According to another aspect of the present invention, the reflection region has a diffusibility and light is received by the light-receiving means at a position off a positive reflection direction corresponding to the entering. By employing this step, a positive reflection component from an upper substrate can be excluded, so that the thickness measurement can be performed also for the reflection-type liquid crystal cell using the reflector having diffusibility, without any effect caused by the positive reflection component from the upper substrate.

According to one aspect of the present invention, a device for measuring a thickness includes a light source; a first polarizing means for transmitting light from the light source; a second polarizing means for transmitting reflected light reflected at an object to be measured; a light receiving means for receiving the reflected light transmitted through the second polarizing means; a dispersing means for spectrally resolving the reflected light received by the light-receiving means to detect a relation between a wavelength λ and a reflected light intensity; a wavelength deriving means for finding a wavelength satisfying a polarizing plane maintaining condition in that the reflected light returns maintaining a same polarizing plane as a polarizing plane at the time of the entering, i.e. that a difference in optical path lengths between an ordinary ray and an extraordinary ray of the reflected light is a sum of an integer multiple of the wavelength and a half-wavelength, or an integer multiple of a wavelength; a Δn·d deriving means for finding a reasonable Δn·d from the wavelength found by the wavelength deriving means and a known twist angle of the liquid crystal layer to find a relation between the wavelength and Δn·d from a plurality of combinations of the wavelength and Δn·d; and a thickness deriving means for finding d by assigning a known combination of wavelength λ and Δn to the relation.

By using the configuration described above, the reflected light is utilized rather than transmitted light, so that an accurate measurement can also be performed for a reflection-type liquid crystal cell. Further, detection is performed for a change of the polarization state, so that the thickness measurement can be performed irrespective of the property of the reflection region, such as being specular and diffusible.

More preferably, the wavelength deriving means is performed by finding a value of a wavelength at which the reflected light intensity assumes an extreme value. By using the configuration, the wavelength that satisfies the polarizing plane-maintaining condition can easily be found from a spectrum, and thus the measurement can readily be performed.

More preferably, a Jones matrix is used in the Δn·d deriving means. By employing this configuration, the variation of the polarization state can be expressed only by applying a mechanical calculation, and thus the operation for obtaining thickness d can be simplified.

More preferably, in the case that β/π is n or n+½ (n is an integer) and $\alpha = n \cdot d\pi/\Theta\lambda$ (equation 1) and $\beta = \Theta \cdot (1+\alpha^2)^{1/2}$ . . . (equation 2) in which Θ is a known twist angle of the liquid crystal layer, a reasonable value of β/π is found from wavelength λ when a polarizing plane of the reflected light is maintained, the twist angle Θ, and the equations 1 and 2, and a relation between the wavelength and Δn·d is found by a calculation from the obtained value of β/π.

By employing the configuration, unreasonable values of β/π are eliminated, such that an approximation representing the most reasonable relation between the wavelength and Δn·d can be found.

More preferably, a transmission axis of the first polarizing means and a transmission axis of the second polarizing means are orthogonal to each other. By this configuration, the spectrum of the exit light will be a minimal value of 0 at the wavelength satisfying the polarizing plane maintaining condition, which facilitates finding of the wavelength.

More preferably, a transmission axis of the first polarizing means and a transmission axis of the second polarizing means are parallel to each other. By this configuration, the spectrum of the exit light will be a maximal value at the wavelength satisfying the polarizing plane-maintaining condition, which facilitates finding of the wavelength.

More preferably, when an angle formed by the transmission axis of the first polarizing means and a direction of alignment on a plane of the liquid crystal layer contacting a substrate to which the light enters is assumed to be φ, the light receiving means, the dispersing means and the wavelength deriving means are used for a plurality of φs in a range of 0° to 90°. By employing the configuration, the values of β/π can be obtained for a plurality of wavelengths λ by a plurality of φs, and thus the measurement can accurately be performed.

Preferably, the Δn·d deriving step uses a Cauchy dispersion formula. By using the configuration, an approximation of wavelength λ and Δn·d can be obtained even for the measurement only for one φ, and thus the thickness measurement can be simplified.

According to another aspect of the present invention, the reflection region has a diffusibility and light is received by the light-receiving means at a position off a positive reflection direction corresponding to the entering. By employing this configuration, a positive reflection component from an upper substrate can be excluded, so that the thickness measurement can be performed also for the reflection-type liquid crystal cell using the reflector having diffusibility, without any effect caused by the positive reflection component from the upper substrate.

To achieve the object described above, according to another aspect of the present invention, a method of measuring a thickness d of a liquid crystal layer having alignment-treated upper and lower surfaces and a birefringent index Δn which is uniform in the thickness direction, in a reflection-type liquid crystal display element including the liquid crystal layer between a pair of substrates and having a reflection region at least in a part of one of the substrates, includes a light-receiving step of entering light from a monochromatic light source, with a wavelength at which birefringent index Δn of liquid crystal is known, into the liquid crystal layer via a first polarizing means and receiving, via a second polarizing means, reflected light exited from the liquid crystal layer by reflecting at the reflection region; a rotational light-receiving step of receiving light while changing a rotational angle which is an angle formed by the first and second polarizing means and the liquid crystal layer when seen from above, maintaining an angle formed by respective transmission axes of the first polarizing means and the second polarizing means to be constant by engaging with the light receiving step; an angle deriving step of finding the rotational angle satisfying a polarizing plane-maintaining condition in that the reflected light returns maintaining a same polarizing plane as a polarizing plane at the time of the entering, i.e., that a difference in optical path lengths between an ordinary ray and an extraordinary ray of the reflected light is a sum of an integer multiple of a wavelength and a half-wavelength, or an integer multiple of a wavelength; and a thickness deriving step of finding d from a reasonable Δn·d selected in accordance with a relation between desired wavelength and Δn·d derived from an angle found by the angle deriving step and a known twist angle of the liquid crystal layer.

By using the steps described above, the reflected light is utilized rather than transmitted light, so that an accurate measurement can also be performed for a reflection-type liquid crystal cell, irrespective of presence/absence of the transmitted light. Further, the steps are for detecting a change of the polarization state and no imaging of the reflected light is required, so that the thickness measurement can be performed irrespective of the property of the reflection region, such as being specular and diffusible. Furthermore, the monochromatic light source with the wavelength at which birefringent index Δn of liquid crystal is known is used, so that Δn·d at the wavelength at which Δn is known can directly be obtained without an approximation. Thus, the measurement of d can further be accurately performed without being affected by accuracy of the approximation.

Preferably, the angle deriving step is performed by finding a value of the rotational angle at which the reflected light intensity assumes an extreme value. By using the step, the rotational angle that satisfies the polarizing plane-maintaining condition can easily be found from a variation of intensity, and thus the measurement can readily be performed.

More preferably, a Jones matrix is used to find Δn·d in the thickness deriving step. By employing this step, the variation of the polarization state can be expressed only by applying a mechanical calculation, and thus the operation for obtaining thickness d can be simplified.

More preferably, using the Jones matrix, in the case that an angle formed by a transmission axis of the first polarizing means and a direction of alignment on an entrance side surface of the liquid crystal layer is assumed to be φ, and that a twist angle of the liquid crystal layer is assumed to be Θ a reasonable value of Δn·d/π is found from an angle φ at which a polarizing plane of the reflected light is maintained and from the known twist angle Θ, to find Δn·d at a wavelength λ from an obtained value of Δn·d/λ.

By employing the steps described above, unreasonable values of Δn·d/π are eliminated such that the most reasonable Δn·d/λ can be obtained, and Δn and λ are known values, so that d can be found.

Preferably, a transmission axis of the first polarizing means and a transmission axis of the second polarizing means are orthogonal to each other. By using this step, the intensity of the exit light will be a minimal value of 0 at the rotational angle satisfying the polarizing plane-maintaining condition, which facilitates finding of the rotational angle.

Preferably, a transmission axis of the first polarizing means and a transmission axis of the second polarizing means are parallel to each other. By using this step, the intensity of the exit light will be a maximal value at the rotational angle satisfying the polarizing plane-maintaining condition, which facilitates finding of the rotational angle.

According to another aspect of the present invention, the reflection region has a diffusibility and light is received by the light-receiving means at a position off a positive reflection direction corresponding to the entering. By employing this step, a positive reflection component from an upper substrate can be excluded, so that the thickness measurement can be performed also for the reflection-type liquid crystal cell using the reflector having diffusibility, without any effect caused by the positive reflection component from the upper substrate.

A device for deriving an angle according to the present invention includes a monochromatic light source; a first polarizing means for transmitting light from the monochromatic light source; a second polarizing means for transmitting reflected light reflected at an object to be measured; a light-receiving means for receiving the reflected light transmitted through the second polarizing means; a rotational light-receiving means for receiving light while changing a rotational angle which is an angle formed by the first and second polarizing means and the liquid crystal layer when seen from above, maintaining an angle formed by respective transmission axes of the first polarizing means and the second polarizing means to be constant by engaging with the light receiving means; and an angle deriving means for finding the rotational angle satisfying a polarizing plane-maintaining condition in that the reflected light returns maintaining a same polarizing plane as a polarizing plane at the time of the entering, i.e. that a difference in optical path lengths between an ordinary ray and an extraordinary ray of the reflected light is a sum of an integer multiple of the wavelength and a half-wavelength, or an integer multiple of a wavelength.

By using the configuration described above, the reflected light is utilized rather than transmitted light, so that an accurate measurement can also be performed for a reflection-type liquid crystal cell. Further, detection is performed for a change of the polarization state, so that the rotational angle satisfying the polarizing plane-maintaining condition can be derived irrespective of the property of the reflection region, such as being specular and diffusible. The obtained rotational angle can be utilized for finding a cell gap d.

To achieve the object described above, according to another aspect of the present invention, a device for measuring a thickness includes a monochromatic light source; a first polarizing means for transmitting light from the monochromatic light source; a second polarizing means for transmitting reflected light reflected at an object to be measured; a light receiving means for receiving the reflected light transmitted through the second polarizing means; a rotational light-receiving means for receiving light while changing a rotational angle which is an angle formed by the first and second polarizing means and the liquid crystal layer when seen from above, maintaining an angle formed by respective transmission axes of the first polarizing means and the second polarizing means to be constant by engaging with the light receiving means; an angle deriving means for finding the rotational angle satisfying a polarizing plane-maintaining condition in that the reflected light returns maintaining a same polarizing plane as a polarizing plane at the time of the entering, i.e. that a difference in optical path lengths between an ordinary ray and an extraordinary ray of the reflected light is a sum of an integer multiple of the wavelength and a half-wavelength, or an integer multiple of a wavelength; a Δn·d deriving means for finding a relation between a wavelength λ and Δn·d from an angle found by the angle deriving means; and a thickness deriving means for finding d by using wavelength λ and a known Δn.

By using the configuration described above, the reflected light is utilized rather than transmitted light, so that an accurate measurement can also be performed for a reflection-type liquid crystal cell. Further, detection is performed for a change of the polarization state, so that the thickness measurement can be performed irrespective of the property of the reflection region, such as being specular and diffusible. Furthermore, the monochromatic light source is used, so that Δnd obtained at the wavelength of the light source can directly be utilized without use of an approximate expression, as long as birefringent index Δn of liquid crystal corresponding to the wavelength is known. Thus, the measurement of d can further be accurately performed without being affected by accuracy of the approximate expression.

More preferably, the angle deriving means is performed by finding a value of the rotational angle at which the reflected light intensity assumes an extreme value. By using the configuration, the rotational angle that satisfies the polarizing plane-maintaining condition can easily be found from a variation of intensity, and thus the measurement can readily be performed.

More preferably, a Jones matrix is used in the $\Delta n \cdot d$ deriving means. By employing this configuration, the variation of the polarization state can be expressed only by applying a mechanical calculation, and thus the operation for obtaining thickness d can be simplified.

More preferably, using the Jones matrix, in the case that an angle formed by a transmission axis of the first polarizing means and a direction of alignment on an entrance side surface of the liquid crystal layer is assumed to be $\phi$, and that a twist angle of the liquid crystal layer is assumed to be $\Theta$, a reasonable value of $\Delta n \cdot d / \pi$ is found from an angle $\phi$ at which a polarizing plane of the reflected light is maintained and from the known twist angle $\Theta$, to find $\Delta n \cdot d$ at a wavelength $\lambda$ from an obtained value of $\Delta n \cdot d / \lambda$.

By employing the configuration, unreasonable values of $\Delta n \cdot d / \lambda$ are eliminated such that the most reasonable $\Delta n \cdot d / \lambda$ can be found, and $\Delta n$ and $\lambda$ are known, so that d can be found.

More preferably, a transmission axis of the first polarizing means and a transmission axis of the second polarizing means are orthogonal to each other. By this configuration, the intensity of the exit light will be a minimal value of 0 at the rotational angle satisfying the polarizing plane maintaining condition, which facilitates finding of the rotational angle.

More preferably, a transmission axis of the first polarizing means and a transmission axis of the second polarizing means are parallel to each other. By this configuration, the intensity of the exit light will be a maximal value at the rotational angle satisfying the polarizing plane-maintaining condition, which facilitates finding of the rotational angle.

More preferably, the reflection region has a diffusibility and light is received by the light-receiving means at a position off a positive reflection direction corresponding to the entering. By employing this configuration, a positive reflection component from an upper substrate can be excluded, so that the thickness measurement can be performed also for the reflection type liquid crystal cell using the reflector having diffusibility, without any effect caused by the positive reflection component from the upper substrate.

Further, to achieve the object described above, a device for deriving a wavelength according to the present invention includes a light source; a first polarizing means for transmitting light from the light source; a second polarizing means for transmitting reflected light reflected at an object to be measured; a light-receiving means for receiving the reflected light transmitted through the second polarizing means; a dispersing means for spectrally resolving the reflected light received by the light-receiving means to detect a relation between a wavelength $\lambda$ and a reflected light intensity; and a wavelength deriving means for finding a wavelength satisfying a polarizing plane-maintaining condition in that the reflected light returns maintaining a same polarizing plane as a polarizing plane at the time of the entering, i.e., that a difference in optical path lengths between an ordinary ray and an extraordinary ray of the reflected light is a sum of an integer multiple of the wavelength and a half-wavelength, or an integer multiple of a wavelength.

By using the configuration described above, the reflected light is utilized rather than transmitted light, so that an accurate measurement can also be performed for a reflection-type liquid crystal cell. Further, detection is performed for a change of the polarization state, so that the wavelength can be derived irrespective of the property of the reflection region, such as being specular and diffusible.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
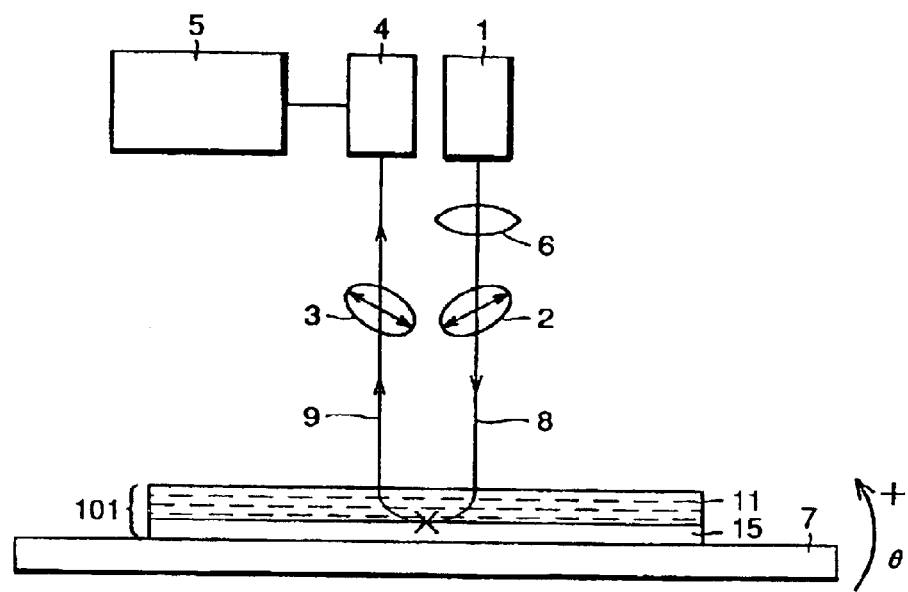
FIG. 1 is a schematic view of a measurement device according to the first embodiment of the present invention.

Referring to FIG. 1, a device is briefly described. Light emitted from a light source 1 passes through a lens 6, is thereafter directed to an entrance side polarizer 2 in which its polarization state is aligned in a predetermined direction, enters into a liquid crystal layer 11 as an entrance light 8, and reaches a reflector 15.

The light reflected at reflector 15 is transmitted again through liquid crystal layer 11 in the opposite direction, and is directed to an exit side polarizer 3 as exit light 9. Only the polarized light in a predetermined direction is transmitted through exit side polarizer 3, and enters into a spectroscope 4 serving both as a light-receiving means and a dispersing means. Though it is unnecessary to limit spectroscope 4 to a certain form as long as it can spectrally resolve the received light, a spectroscope enabling a rapid process is more desirable.

Data of the spectrum obtained at spectroscope 4 is sent to an electronic computer 5 in which a certain operational process is performed to calculate a value of a cell gap. It is noted that a series of measurements can be automated by allowing electronic computer 5 to instruct setting of angles and attachment/removal of entrance side polarizer 2 and exit side polarizer 3.

Light source 1 and spectroscope 4 are generally large in size, so that light source 1 and entrance side polarizer 2, and exit side polarizer 3 and spectroscope 4 may respectively be connected by optical fibers to avoid anxiety about a place of installment.

A liquid crystal cell 101 to be measured is mounted on a stage 7. Stage 7 is formed such that it can rotate by an arbitrary angle θ around an axis perpendicular to a plane formed by entrance light 8 and exit light 9, and passing a point where entering light 8 and reflector 15 cross with each other. Further, stage 7 may be made slidable in back/forth and left/right directions to facilitate shifting of a measurement point.

A tungsten bulb is used for light source 1. Though in this embodiment, a diameter of a spot on reflector 15 is assumed to be approximately 5 mmφ for a measurement, if the measurement is required for a narrower region, a magnification of lens 6 arranged in the midstream may be modified to allow the spot diameter to be desirably set. As for a range of the wavelength to be measured, a visible bandwidth is generally sufficient for measuring the cell gap of the liquid crystal cell, so that the measurement was performed in the range of 380 nm to 780 nm and with a resolving power of 0.1 nm.

Figure 2:
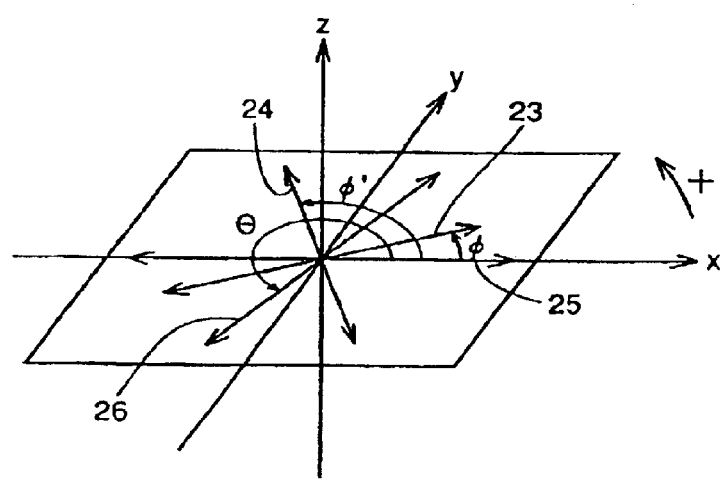
FIG. 2 illustrates a coordinate system.

A coordinate system for illustrating azimuth angles of polarizers 2, 3 and liquid crystal cell 101 is now described. Referring to FIG. 2, liquid crystal cell 101 is horizontally placed, with reflector 15 being at the bottom, and an upper side of the liquid crystal cell, i.e. a direction of the light source seen from crystal cell 101, is assumed to be a positive direction of the z axis. An upper substrate side alignment direction 25 of liquid crystal is assumed to be a positive direction of the x axis. As shown in FIG. 2, a positive sign is taken in an anticlockwise rotation direction when seen from the top of liquid crystal cell 101, and an axis which is 90° rotated from the x axis is assumed to be a positive direction of the y axis.

As shown in FIG. 2, when upper-side alignment direction 25 is on the x axis, i.e. at 0°, an azimuth of a reflector-side alignment direction 26, i.e. a twist angle of liquid crystal layer 11, will be Θ. An azimuth of a transmission axis 23 of entrance side polarizer 2 is assumed to be φ. An azimuth of a transmission axis 24 of exit side polarizer 3 is assumed to be φ'.

Because liquid crystal layer 11 within liquid crystal cell 101 is a birefringent body, it changes a polarization state of light when the light enters therein. This change of the polarization state depends on a wavelength and the polarizing direction of the entering light, the twist angle of liquid crystal layer 11, the cell gap, and the birefringent index of the liquid crystal. Thus, by clearly defining the relations among the above, the cell gap can be obtained based on those values.

A general way of showing an action of birefringence of the light is to use the Jones matrix. This method is described by assuming that the twist angle of liquid crystal layer 11 is Θ, the birefringent index of the liquid crystal is Δn and the cell gap is d. The polarizing action when light at a wavelength λ proceeds to a negative direction on the z axis to transmit through the liquid crystal layer is represented using the Jones matrix as follows:

$$J_{-Z} = \begin{bmatrix} a & b \\ -b* & a* \end{bmatrix} \quad (a)$$

wherein $$a = \cos\Theta\cos\beta + \frac{1}{\sqrt{1+\alpha^2}}\sin\Theta\sin\beta - \frac{i\alpha}{\sqrt{1+\alpha^2}}\cos\Theta\sin\beta \quad (b)$$

$$b = -\sin\Theta\cos\beta + \frac{1}{\sqrt{1+\alpha^2}}\cos\Theta\sin\beta - \frac{i\alpha}{\sqrt{1+\alpha^2}}\sin\Theta\sin\beta$$

$$\alpha = \frac{\Delta n \cdot d}{\Theta\lambda}\pi, \beta = \Theta\sqrt{1+\alpha^2}$$

Further, a polarizing action when the light is reflected at the reflector and proceeds to a positive direction to again transmit through the liquid crystal layer is represented by $J_{+Z}$ which is a transposed matrix of $J_{-Z}$. A polarization action received by passing back and forth through the liquid crystal layer is represented by $$J_{LC} = J_{+Z} \times J_{-Z}.$$

When an angle of an entrance side polarizer transmission axis 23 is φ, an angle of exit side polarizer transmission axis 24 is φ', and an amplitude of the entering light is E; an amplitude $E_t'$ of the exiting light in a direction of exit side polarizer transmission axis 24 and an amplitude $E_a'$ in an azimuth orthogonal thereto are represented using the Jones matrix as:

$$\begin{bmatrix} E'_t \\ E'_a \end{bmatrix} = \begin{bmatrix} 1 & 0 \\ 0 & 0 \end{bmatrix} \times R(\phi') \times J_{LC} \times R(-\phi) \times \begin{bmatrix} E \\ 0 \end{bmatrix} \quad (c)$$

wherein $$R(\phi) = \begin{bmatrix} \cos\phi & \sin\phi \\ -\sin\phi & \cos\phi \end{bmatrix} \quad (d)$$

Further, entrance light intensity $I_{in}$ and exit light intensity $I_{out}$ are respectively represented as follows:

$$I_{in}=E^2, I_{out}=Et'^2+E_a'^2,$$

wherein the condition where exit light intensity $I_{out}$ is 0 when $\phi'=\phi+\pi/2$ is:

(i) When $\phi$ is $\pi/2 \times n$ ($n \geq 0$: integer),
$\beta/\pi$ is n ($n \geq 0$: integer) independent of $\Theta$;

(ii) When $\phi$ is $\pi/4+\pi/2 \times n$ ($n \geq 0$: integer),
$\beta/\pi$ is n/2 ($n \geq 0$: integer) independent of $\Theta$; and (iii) When $\phi$ is neither of the above, $\phi$ depends on $\Theta$.

Figure 3:
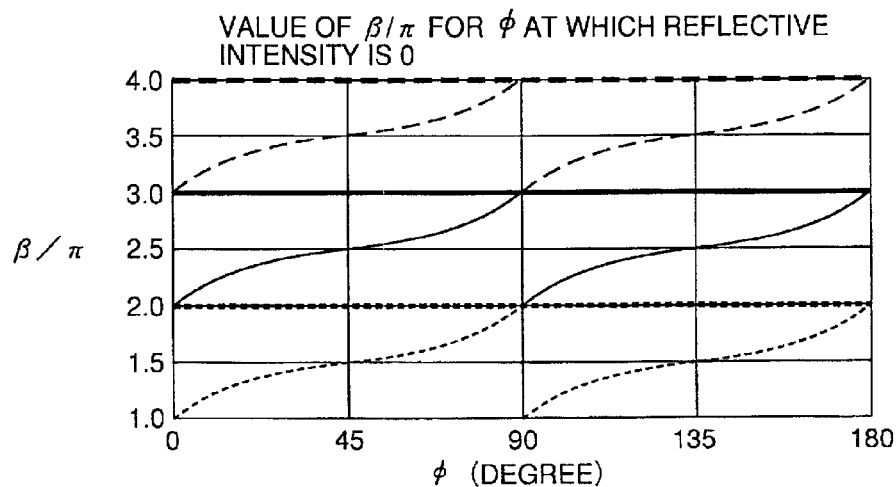
FIG. 3 is a graph showing values of $\beta/\pi$ for values of $\phi$, at which an exit light intensity is 0.

As an example, a relation between $\phi$ and $\beta/\phi$ satisfying the condition where exit light intensity $I_{out}$ is 0 in a STN (Super Twisted Nematic) type liquid crystal display element of $\Theta = 4\pi/3$ (240°) is shown in FIG. 3.

The condition represents that a difference in optical path lengths between an ordinary ray and an extraordinary ray when light transmits through the liquid crystal cell once is a sum of an integer multiple of wavelength $\lambda$ and a half-wavelength $\lambda/2$, or an integer multiple of wavelength $\lambda$. When the condition is satisfied, the reflected light has a property of coming back maintaining the polarizing plane of the entrance light. This condition is hereinafter referred to as "polarizing plane maintaining condition." Thus, under the condition of $\phi'=\phi+\pi/2$, the reflected light cannot transmit through exit side polarizer 3, and thus exit light intensity $I_{out}$ will be 0.

As can be seen from FIG. 3, this relation is cyclic, and the same relation can be obtained in each 90° range of $\phi$, such as from 0° to 90° and from 90° to 180°. Therefore, it will be sufficient if the measurement is performed at an appropriate angle in a range of $\phi=0$ to 90°. The reflected light is measured at several angles within the range of $\phi=0°$ to 90° to detect a wavelength to be an extreme value. The relations as shown in FIG. 3 is utilized to identify a value of $\beta/\pi$ at the wavelength. If $\beta/\pi$ is found, $\alpha$ can be found, and the relation between $\Delta n \cdot d$ and $\lambda$ can also be found. If the relation between $\Delta n \cdot d$ and $\lambda$ is found, a known combination of $\lambda$ and $\Delta n$ can be assigned to find d.

It is ideal to input/output entrance light 8 and exit light 9 perpendicular to the upper surface of liquid crystal cell 101 to perform the measurement. On the other hand, it is easier to assemble a device if the light enters at an incident angle. This incident angle is desirably as small as possible, since a greater angle adversely affect the accuracy of approximation by the Jones matrix. The incident angle is adjusted by changing a slope angle $\theta$ of stage 7, as shown in FIG. 1.

Liquid crystal having a birefringent index $\Delta n$ of 0.135 at a wavelength 589 nm is injected to liquid crystal cell 101 formed by reflector 15 with a diffusibility of $\Theta=240°$ made by a spacer having a particle diameter of 6 $\mu$m to form liquid crystal layer 11, the resulted liquid crystal cell being an object to be measured. Inclination of stage 7 is set to have an incident angle of 5° and an output angle of 0°. The reason for setting such incident and output angles will be described later. Light was made to enter from an azimuth of $\Theta/2$.

Light was transmitted through entrance side polarizer 2 to enter into liquid crystal cell 101 under the respective conditions of $\phi=0.0°$, 22.5°, 45.0° and 67.5°, and the reflected light is transmitted through exit side polarizer 3 which is $\phi'=\phi+\pi/2$, to spectrally resolve the reflected light at spectroscope 4. The results are shown in FIGS. 4 to 7. The state where $\phi$ and $\phi'$ are orthogonal to each other is hereinafter referred to as "orthogonal phase."

Figure 4:
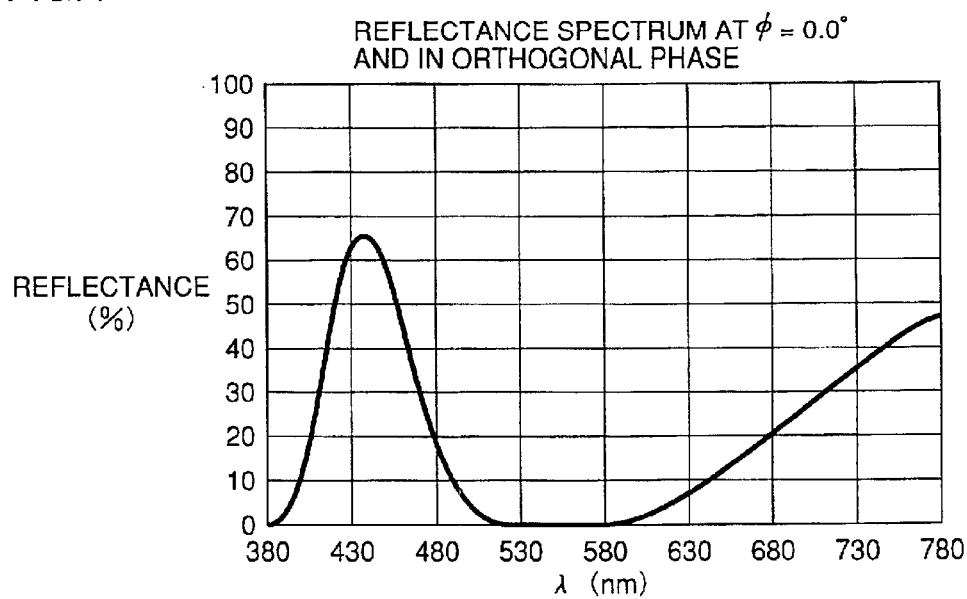
FIG. 4 is a graph showing a spectrum at $\phi=0.0°$ and in an orthogonal phase according to the first embodiment of the present invention.

As shown in FIG. 4, from the spectrum of the reflected light at $\phi=0.0°$, 548.8 nm was obtained as a wavelength at which exit light intensity $I_{out} = 0$. Here, $\phi$ corresponds to the case (i) above, so that $\beta/\pi$ is assumed to be an integer. Next, discussion is made on what integer $\beta/\pi$ is $\beta/\pi=0$ is impossible because $\alpha>0$. Assuming that $\beta/\pi=1$, and $\Theta=240°$ ($4\pi/3$) is assigned to the relational equation of $\alpha$ and $\beta$ for a calculation, no solution exists for $\alpha$. Therefore, $\beta/\pi=1$ is incorrect. Assuming that $\beta/\pi=2$, $(\Delta n \cdot d/\lambda)^2=20/9$, and $\Delta n \cdot d/\lambda=1.4907$ can be obtained. Assuming that $\beta/\pi=3$, $(\Delta n \cdot d/\lambda)^2=65/9$, and $\Delta n \cdot d/\lambda=2.6874$ is obtained.

In the present embodiment, the liquid crystal has the spacer with its particle diameter of 6 $\mu$m and the birefringent index $\Delta n$ of 0.135 at 589 nm, so that the value of $\Delta n \cdot d$ at 589 nm is expected to be a value approximate to 6000×0.135= 810 nm. Also at 548.8 nm, a value approximated to the above is expected. If $\lambda=548.5$ nm is assigned to $\Delta n \cdot d/\lambda=2.6874$ when $\beta/\pi=3$, $\Delta n \cdot d=1475$ nm is obtained. This is too large to be reasonable. Whereas, $\Delta n \cdot d/\lambda=1.4907$ when $\beta/\pi=2$ results in $\Delta n \cdot d=818.1$ nm. This value is close enough to the above 810 nm, which is considered to be reasonable.

Figure 5:
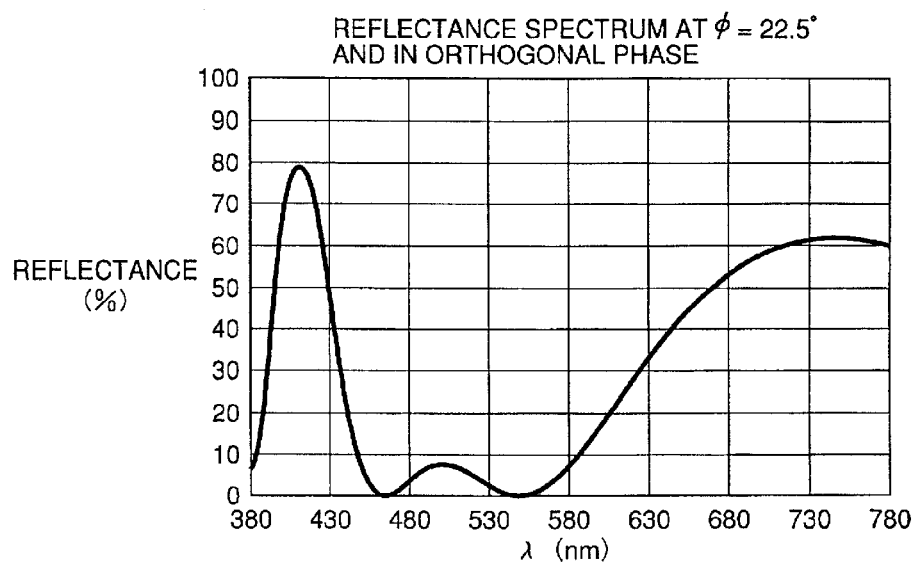
FIG. 5 is a graph showing a spectrum at $\phi=22.5°$ and in the orthogonal phase according to the first embodiment of the present invention.

As shown in FIG. 5, two values 463.1 nm and 548.8 nm are obtained as wavelengths at which exit light intensity $I_{out}=0$ at $\phi=22.5°$. The wavelength 548.8 nm has the same the condition as in the case with $\phi=0°$, so that $\beta/\pi=2.000$ is assumed. For the value of $\beta/\pi$ corresponding to the wavelength of 463.1 nm, possibilities are 2.335, 3.381 and so forth from FIG. 3, and when the validity of $\Delta n \cdot d$ is examined for each as described above, $\beta/\pi=2.335$ and $\Delta n \cdot d=887.7$ nm can be found.

Figure 6:
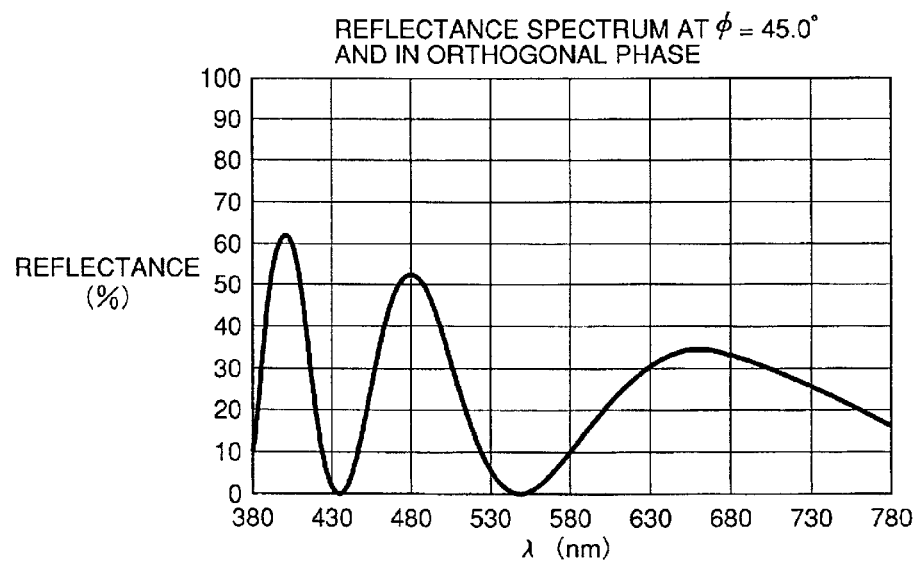
FIG. 6 is a graph showing a spectrum at $\phi=45.0°$ and in the orthogonal phase according to the first embodiment of the present invention.

As shown in FIG. 6, two values of 434.8 nm and 548.8 nm are obtained for the wavelength at which exit light intensity $I_{out}=0$ at $\phi=45.0°$. The value of $\beta/\pi$ corresponding to 548.8 nm is 2.000 as is already found. The value of $\beta/\pi$ corresponding to 434.8 nm can be found as 2.500 from FIG. 3 and by examining the validity of $\Delta n \cdot d$. The value of $\Delta n \cdot d$ corresponding to $\beta/\pi=2.500$ will be 919.0 nm.

Figure 7:
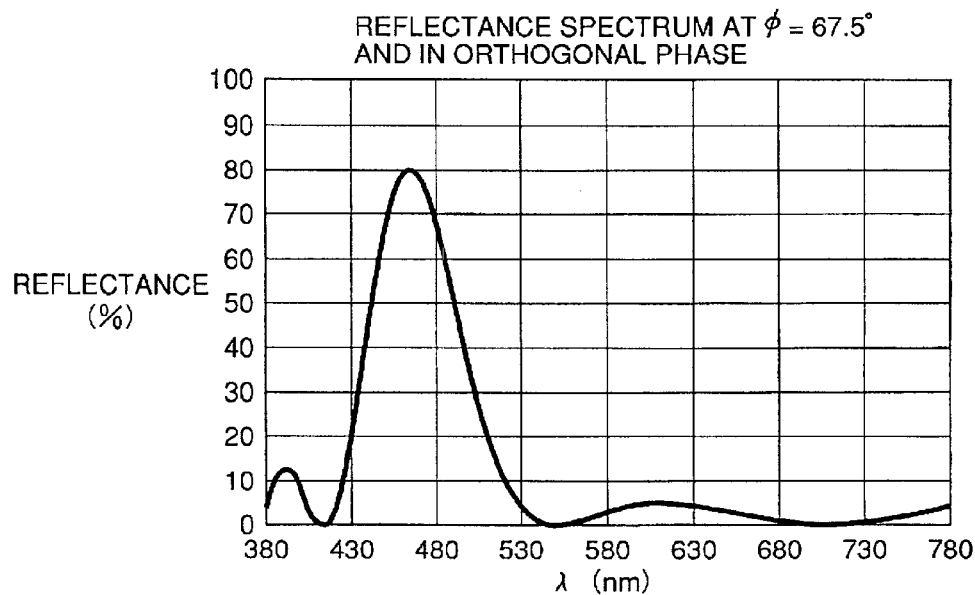
FIG. 7 is a graph showing a spectrum at $\phi=67.5°$ and in the orthogonal phase according to the first embodiment of the present invention.

As shown in FIG. 7, three values of 413.5 nm, 548.8 nm and 708.4 nm were obtained as the wavelength at which exit light intensity $I_{out}=0$ at $\phi=67.5°$. For the values of $\beta/\pi$ in this case, 2.648, 2.000 and 1.711 are respectively obtained as similar to the above. The values of $\Delta n \cdot d$ at these wavelengths will be 946.0 nm, 811.1 nm and 759.6 nm respectively.

Figure 8:
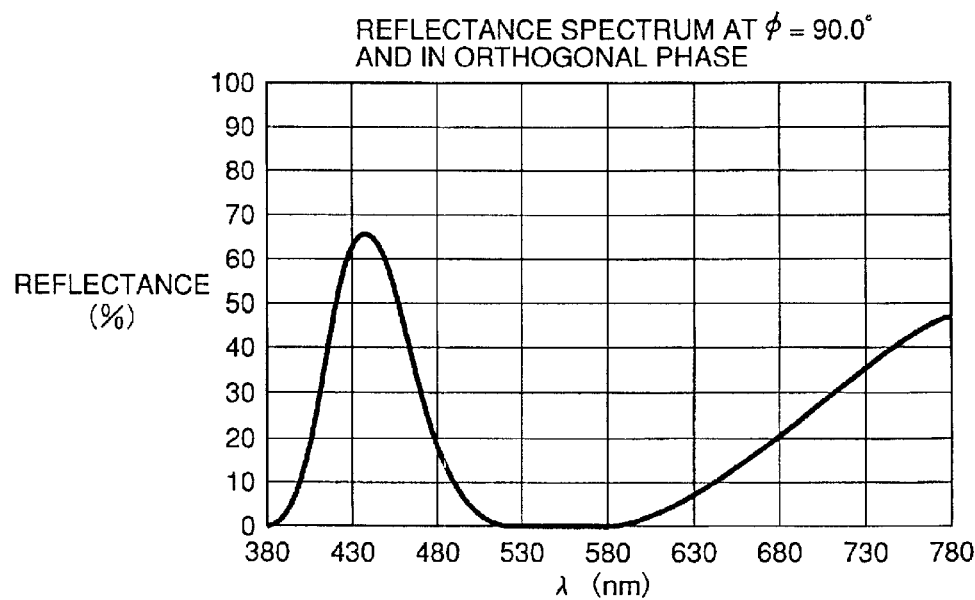
FIG. 8 is a graph showing a spectrum at $\phi=90.0°$ and in the orthogonal phase according to the first embodiment of the present invention.

FIG. 8 shows the spectrum of the reflected light at $\phi=90.0°$, which is equal to that at $\phi=0.00$ shown in FIG. 4. This is because, in FIG. 3, the curves of the identical shapes are repeated in 90° cycles of $\phi$.

The obtained results as described above are shown in Table 1 for each wavelength.

TABLE 1

| wavelength (nm) | $\beta/\pi$ | $\Delta n \cdot d$ (nm) |
|---|---|---|
| 413.5 | 2.648 | 946.0 |
| 434.8 | 2.500 | 919.5 |
| 463.1 | 2.335 | 887.7 |
| 548.8 | 2.000 | 818.1 |
| 708.4 | 1.711 | 759.6 |

Figure 9:
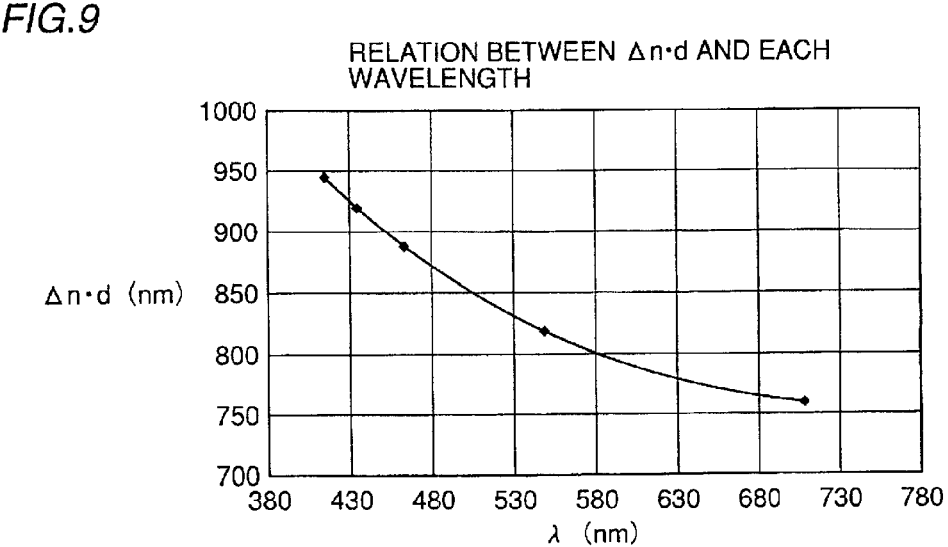
FIG. 9 is a graph showing a relation between a wavelength and $\Delta n \cdot d$ according to the first embodiment of the present invention.

FIG. 9 shows plotted relations between the wavelength $\lambda$ and $\Delta n \cdot d$ shown in Table 1. Each of These relations is approximated by a cubic as $$\Delta n \cdot d = -2.849 \times 10^{-6} \times \lambda^3 + 6.725 \times 10^{-3} \lambda^2 - 5.426 \times \lambda + 2.241 \times 10^{-3}.$$

Though the approximation was made here by the cubic, other appropriate expressions may also be used.

In the present embodiment, a liquid crystal in which $\Delta n$ is known to be 0.135 at 589 nm is used, so that $\Delta n \cdot d$ will be 796.3 nm when $\lambda=589$ nm is assigned to the above cubic. Cell gap $d=796.3/0.135=5.90$ μm is found. This is the value of the cell gap to be measured.

Though the measurement was performed in increments of 22.5° of $\phi$, an interval can be made shorter for each measurement to obtain more accurate relations of wavelength dissipation of $\Delta n \cdot d$ and also to improve the accuracy of the value of the cell gap d to be found.

The angle formed by $\phi$ and $\phi'$ was made to be 90° in order to make the exit light intensity entering spectroscope 4 to be 0 when exit light 9 returns from liquid crystal cell 101 maintaining the same polarizing plane as that of entrance light 8. This is to utilize the property of the reflected light in that the light returns maintaining the same polarizing plane as a polarizing plane at the time of the entrance if the polarizing plane-maintaining condition is satisfied, in order to facilitate detection of such a state where the light returns maintaining the same polarizing state.

Because the liquid crystal display element utilizes changes of a polarization state, reflector 15 is always selected such that it will not affect the polarization state even if it is a diffusible (nonspecular) reflector having a rugged surface. This is because, if the polarization state is varied at reflector 15, the polarization state cannot be switched as designed, thereby significantly damaging the display quality.

An example is described where the angle formed by entrance light 8 and exit light 9 assumes 5° as in the present embodiment. It is understood that the angle is not limited to 5°.

The shape of the reflector of the reflection-type color liquid crystal display element that has been currently put into practical use can be roughly divided into two types. One is a specular reflector with a flat surface, whereas the other is a reflector having a diffusibility by providing roughness on the surface.

If reflector 15 is a specular reflector, the inclination of stage 7 is set such that the incident angle is 2.5° and the output angle is 2.5°, and the light is emitted from the azimuth of $\Theta/2$ to perform the measurement. The specular reflector will have the maximum intensity of the exit light at a position of positive reflection, so that the reflected light is preferably detected at the position of positive reflection to reflector 15. In such a case, the optical path length transmitting through the liquid crystal layer will be $1/\cos 2.5°= 1.010$ times longer, resulting in approximately 0.2% longer optical path length in both entrance and exit paths, which will be no substantial problem in accuracy.

On the other hand, if reflector 15 is a diffusible reflector as in the present embodiment, the reflected light diffuses in various directions by reflector 15, so that components reflected in the positive reflection direction is greatly reduced, which results that components positively reflected at the surface of upper substrate 12 of liquid crystal cell 101 dominates, as detectable light in the positive reflection direction, over components of the light reflected by reflector 15. This greatly distorts the shape of the spectrum to be measured. Accordingly, the detection portion of the exit light is displaced from the position of positive reflection to the position out of the reflected light positively reflected at the surface of upper substrate 12 of liquid crystal cell 101 with a supporting point being at a position where entrance light 8 and reflector 15 cross each other, in order to detect the reflected light diffused by reflector 15 without any effect of the positive reflection from upper substrate 12.

Specifically, the measurement may preferably be performed by setting the inclination of stage 7 such that the entrance angle is 5° and the exit angle is 0°, still maintaining the angle formed by entrance light 8 and exit light 9 to be 5°.

A reflectance is represented on percentage of the reflected light intensity to a reference reflected light intensity. Exit side polarizer 3 is disposed on an optical path with the angle as same as that at the time of measurement, light is emitted into liquid crystal cell 101 in a state where no entrance side polarizer 2 is disposed on the optical path, the reflected light reflected at reflector 15 is received at spectroscope 4 similarly to the time of measurement, and the light is spectrally resolved to attain each spectrum intensity which is to be the reference reflected light intensity, i.e. 100%. As such, by using the reflected light from liquid cell 101 similarly to the time of the measurement, the wavelength dependency of the reflective property in the liquid crystal cell can be eliminated, and thus a spectral intensity purely reflecting the wavelength dependency of the polarization action can be measured.

The polarization direction of the exit light entering the spectroscope is preferably set in the same direction at the time of measurement of the reference reflected light intensity and that of the cell gap, since a diffraction grating of the spectroscope has a polarization property.

However, if a spectroscope unaffected by the polarization state is used, entrance side polarizer 2 may be disposed on the optical path with the angle used at the time of cell gap measurement in place of exit side polarizer 3, and exit side polarizer 3 may be out of the optical path, to measure the reference reflected light intensity, In sum, the measurement can be performed in a state where the light emitted from light source 1 transmits through only one polarizer before it is received at spectroscope 4.

Second Embodiment

Figure 10:
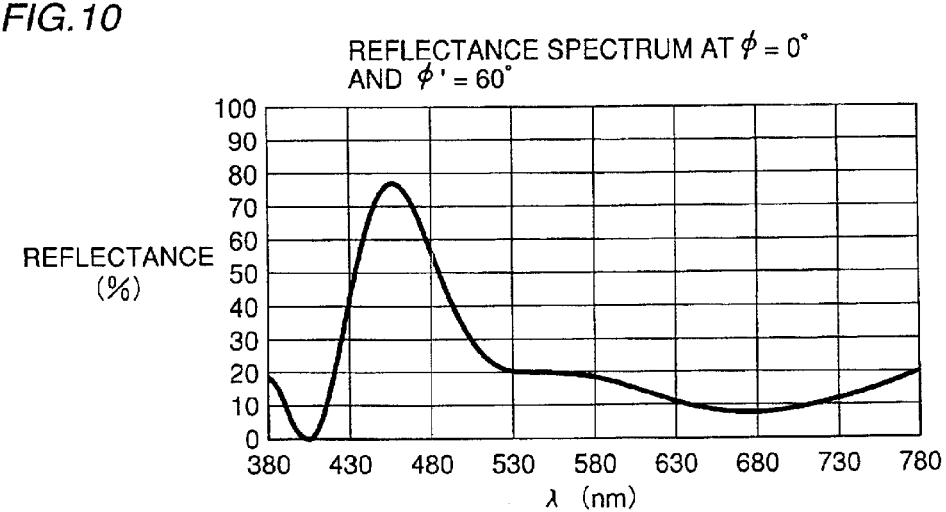
FIG. 10 is a graph showing a spectrum at $\phi=0°$ and $\phi'=60°$ according to the second embodiment of the present invention.

The present invention can also be applied possibly to an example where the angle formed by $\phi$ and $\phi'$ is other than 90°. For example, FIG. 10 shows a spectrum obtained at $\phi=0°$ and $\phi=60°$. Conditions except for the values of $\phi$ and $\phi'$ are the same as in the first embodiment. However, if the angle formed by $\phi$ and $\phi'$ is other than 90° as such, the extreme value tends to be indefinite, making an analysis difficult.

Third Embodiment

Figure 11:
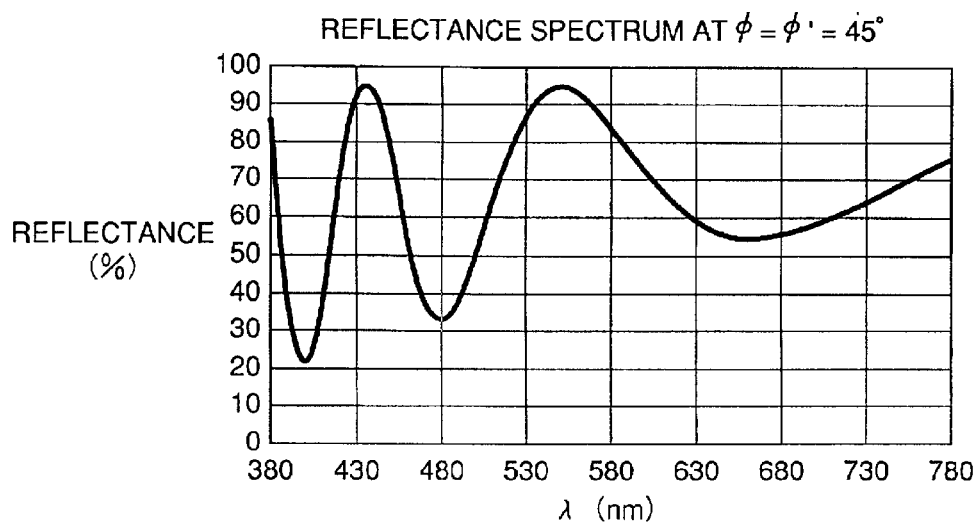
FIG. 11 is a graph showing a spectrum at $\phi=45.0°$ and in a parallel phase according to the third embodiment of the present invention.

FIG. 11 shows a spectrum obtained at $\phi$ and $\phi'$ are made parallel, (hereinafter this state is referred to as "parallel phase."), for example when $\phi=45°$ and $\phi'=45°$. Conditions other than $\phi$ and $\phi'$ are the same as in the first embodiment. This makes no difference in utilizing the property of the reflected light in which the light returns maintaining the same polarizing plane as the polarizing plane at the time of the entrance when the polarizing plane-maintaining condition is satisfied. The only difference is that the spectrum intensity, which is the minimal value 0 in the orthogonal phase, is replaced by the maximal value in the parallel phase, and thus a similar analysis is possible by noting that point. By comparing FIG. 11 with FIG. 6 having the same $\phi=45.0°$, it can be seen that the minimal value in FIG. 6 is replaced by the maximum in FIG. 11. It is noted that the maximal value should have the reflectance of 100% in a theoretical sense, which in practice will not necessarily be 100% as shown in FIG. 11. This is due to the existence of absorption loss by entrance side polarizer 2 which was not disposed on the optical path at the time of the measurement of the reference reflected light intensity.

When the measurement is performed in the parallel phase, one polarizer can serve both as entrance side polarizer 2 and as exit side polarizer 3. This can simplify the measurement device.

Assuming that the conventional method 1 is used, the polarizers are arranged such that the entrance side polarizer is at +45° from the entrance side alignment direction of the liquid crystal cell and the exit side polarizer is at +45° from the exit side alignment direction of the liquid crystal cell which are applied to the case with the reflection-type to find that the arrangement in which the polarizer in the parallel phase and at $\phi=\phi'=45.0°$ has a close condition among the embodiments according to the present invention. This is what was shown in FIG. 11 in the third embodiment. Thus, the operation method of the conventional method 1 is applied to the data of the spectrum obtained in FIG. 11.

In the conventional method 1, the operation is performed using $$\Delta n \cdot d = \lambda_o \cdot (m_o^2 - \Theta^2/\pi^2)^{1/2}$$

as a condition of the maximal intensity, and $$\Delta n \cdot d = \lambda_o \cdot ((m_o - \frac{1}{2})^2 - \Theta^2 \pi^2)^{1/2}$$

as a condition of the minimal intensity, wherein

Δn: birefringent index (Δn=extra ordinary index $n_e$-ordinary index $n_o$)
$\lambda_o$: wavelength to be maximum or minimum
$m_o$: degree
Θ: twist angle of the liquid crystal layer.

From FIG. 11, values of 434.8 nm and 548.8 nm are obtained for the maximal wavelength, whereas values of 400.5 nm, 479.1 nm and 662.5 nm are obtained for the minimal wavelength. These wavelengths and the above equations are used to calculate Δn·d when $m_o$ is 1 to 5. However, if $m_o$=1, $m_o^2 - \Theta^2/\pi^2$ and $(m_o-\frac{1}{2})2-2/\pi$ will be negative, which is inappropriate. Thus, Δn·d is calculated at $m_o$ being 2 to 5. The calculated results at the maximal wavelength is shown in Table 2. The calculated results at the minimal wavelength is shown in Table 3.

TABLE 2

| | Δn · d (nm) corresponding to each wavelength λ | |
|---|---|---|
| $m_0$ | λ = 434.8 nm | λ = 548.8 nm |
| 2 | 648.2 | 818.1 |
| 3 | 1168.5 | 1474.9 |
| 4 | 1639.7 | 2069.7 |
| 5 | 2095.3 | 2644.6 |

TABLE 3

| | Δn · d (nm) corresponding to each wavelength λ | | |
|---|---|---|---|
| $m_0$ | λ = 400.5 nm | λ = 479.1 nm | λ = 662.5 nm |
| 2 | 275.2 | 329.2 | 455.3 |
| 3 | 847.0 | 1013.2 | 1401.0 |

TABLE 3-continued

| | Δn · d (nm) corresponding to each wavelength λ | | |
|---|---|---|---|
| $m_0$ | λ = 400.5 nm | λ = 479.1 nm | λ = 662.5 nm |
| 4 | 1296.1 | 1550.4 | 2143.9 |
| 5 | 1721.3 | 2059.1 | 2847.4 |

Here, $m_o$ corresponding to each wavelength is found. The value of Δn·d of generally used liquid crystal has a normal dispersion which is greater at a shorter wavelength side, resulting that the greater the wavelength is, the smaller Δn·d becomes. Thus, Δn·d/π becomes smaller as the wavelength becomes longer, and thus $m_o$ will also have a smaller value at a long wavelength side. Therefore, at the maximal wavelength, the value of $m_o$ is higher at 434.8 nm than at 548.8 nm, and similarly at the minimal wavelength, the value of $m_o$ is higher sequentially from 400.5 nm, 479.1 nm and 662.5 nm. Among them, the degree $m_o$ becomes smaller one by one sequentially from the shorter wavelength to the longer wavelength. The correlation between Δn·d of the liquid crystal layer and the wavelength will be as shown in Table 4.

TABLE 4

| | Δn · d corresponding to each wavelength λ(nm) | | | | |
|---|---|---|---|---|---|
| $m_0$ | λ = 400.5 nm | λ = 434.8 nm | λ = 479.1 nm | λ = 548.8 nm | λ = 662.5 nm |
| 2 | 275.2 | — | — | — | — |
| 3 | 847.0 | 648.2 | 329.2 | — | — |
| 4 | 1296.1 | 1168.5 | 1013.2 | 818.1 | 455.3 |
| 5 | 1721.3 | 1639.7 | 1550.4 | 1474.9 | 1401.0 |

$m_o$=2, 3, 4 and 5 in the left column of Table 4 indicate the values of $m_o$ at the wavelength λ=400.5 nm as a guide, and $m_o$ will be 1 smaller when shifted one to the right in the same row in Table 4.

Figure 12:
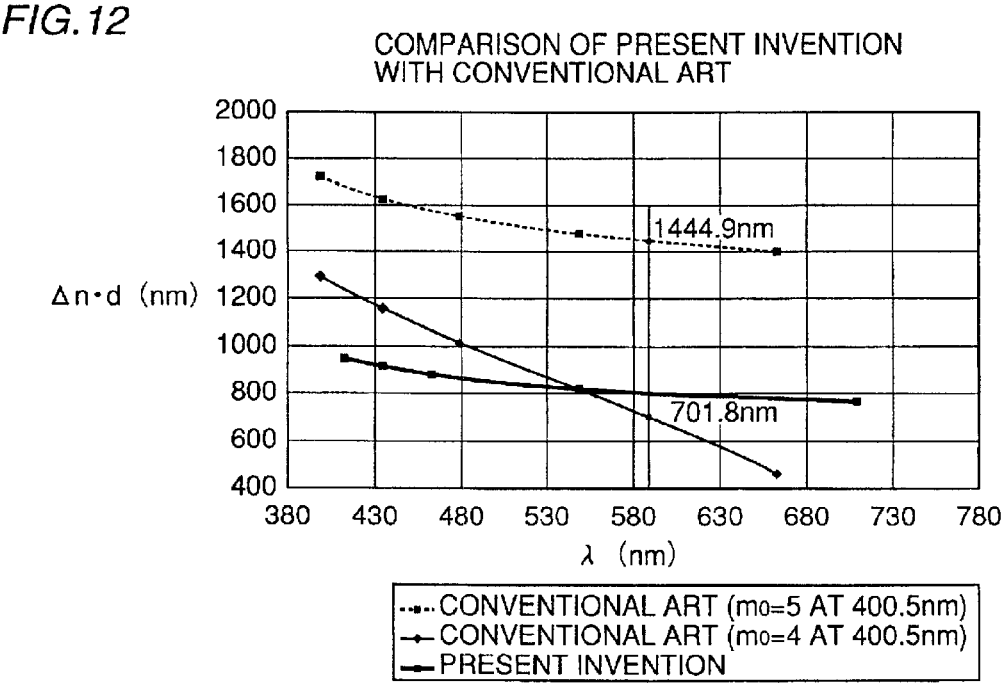
FIG. 12 is a graph showing a comparison between the conventional method 1 and the method according to the present invention.

When $m_o$ is 2 or 3 at 400.5 nm, there is no appropriate value on the longer wavelength side, and hence the relation between the wavelength and Δn·d when $m_0$ is 4 or 5 at 400.5 nm is shown in FIG. 12. FIG. 12 also shows a correct relation between the wavelength and Δn·d obtained from the measurement by the method according to the present invention. By using the conventional method, the wavelength and Δn·d cross with each other only at 548.8 nm when $m_o$=4, and mostly they are significantly deviated. Here, Δn·d at 589 nm can be found approximately as 701.8 nm and 1444.9 nm respectively, and a combination of Δn=0.135 at 589 nm is assigned to find that cell gap d=5.20 μm and 10.70 μm, which are greatly deviated from the value of 5.90 μm obtained by the present invention.

This clearly shows that the conventional method 1 is not sufficient for the cell gap measurement in the reflection-type liquid crystal cell. Therefore, for the measurement of the cell gap in the reflection-type liquid crystal cell, no other appropriate methods exist except for the method according to the present invention, and hence the present invention significantly contributes to the technical progress in this field.

Fourth Embodiment

Though the method in which φ is varied to examine and analyze the wavelength at which the exit light intensity assumes an extreme value as described in the first to third embodiments is characterized in an accurate measurement, the number of measurements will be increased and the time required for a measurement will be longer since φ needs to be varied. Additionally, a mechanism for rotating the polarizer or the liquid crystal cell will be required. In this embodiment, a less accurate but more simplified measurement method is described.

If there are two or more wavelengths at which the reflected light intensity is 0 in a wavelength range measured by spectroscope 4 when φ is fixed to a certain value in the orthogonal phase, β/π is found at each wavelength and its validity is examined, to find Δn·d corresponding to the wavelength. By interpolating an appropriate approximation between two or three of the solutions, cell gap d can be obtained from a known combination of the wavelength and Δn.

Figure 13:
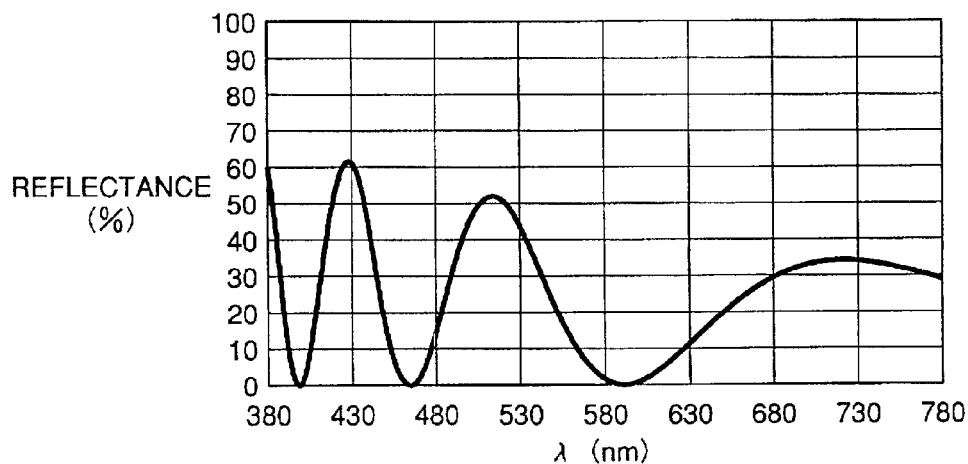
FIG. 13 is a graph showing a spectrum at $\phi=45.0°$ and in the orthogonal phase according to the fourth embodiment of the present invention.

Liquid crystal having a birefringent index Δn of 0.150 at a wavelength 589 nm is injected to liquid crystal cell 101 formed by a diffusible reflector 15 of Θ=240° made from a spacer with the particle diameter of 6 μm to form liquid crystal layer 11, the resulted liquid crystal cell being an object to be measured. Assuming that φ=45.0°, light is entered from the azimuth of Θ/2. The spectrum of the obtained reflected light is shown in FIG. 13. FIG. 13 shows that the wavelengths at which the exit light intensity is 0 are 399.4 nm, 465.3 nm and 592.5 nm. By assigning the predicted β/π, relations shown in Table 5 can be obtained.

TABLE 5

Δn · d corresponding to each wavelength λ(nm)

| | type I | | type II | | type III | |
|---|---|---|---|---|---|---|
| λ(nm) | β/π | Δn · d(nm) | β/π | Δn · d(nm) | β/π | Δn · d(nm) |
| 399.4 | 2.5 | 844.6 | 3.0 | 1073.4 | 3.5 | 1716.6 |
| 465.3 | 2.0 | 693.6 | 2.5 | 984.0 | 3.0 | 1754.8 |
| 592.5 | 1.5 | 407.2 | 2.0 | 883.2 | 2.5 | 1917.4 |

Figure 14:
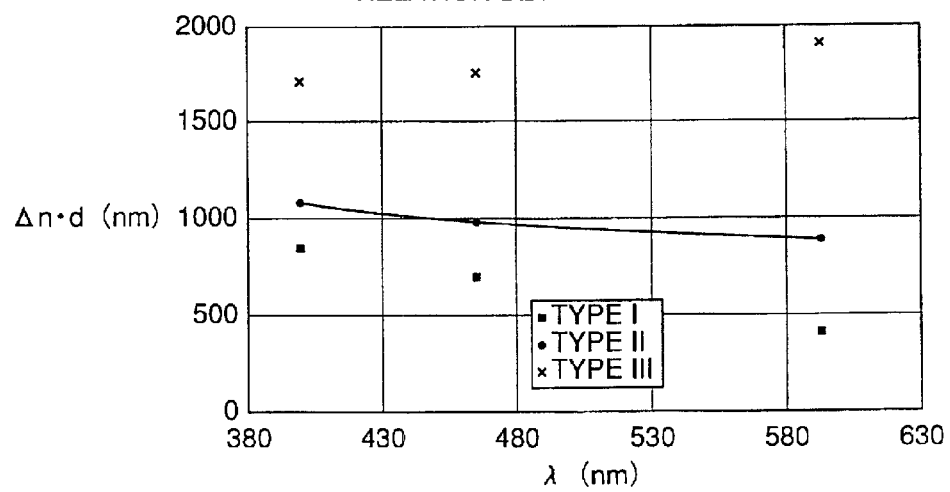
FIG. 14 is a graph showing a relation between a wavelength and $\Delta n \cdot d$ according to the fourth embodiment of the present invention.

The relations are plotted in FIG. 14. In the present embodiment, a spacer with the particle diameter of 6 μm and a liquid crystal of Δn=0.150 at 589 nm are used, so that the expected Δn·d at 589 nm is 900 μm. Thus, type II is the most reasonable among types I to III in Table 5. Next, the wavelength dispersity of type II is obtained by using Cauchy dispersion formula, Δn·d=A+B/λ², to find coefficients A and B being A=729.0 and B=5.416×10⁷. The value λ=589 nm is assigned to thereby obtained approximation, to find that Δn·d=885.1 nm. Thus, cell gap d=885.1 nm/0.150=5.90 μm can be obtained.

In the present embodiment, φ is not required to be varied and the measurement can be performed with the polarizer remaining fixed, so that it is more convenient as a simple measurement method, compared to the first to third embodiments. It is noted that though Cauchy dispersion formula is herein used, other approximations may also be used as required.

Figure 15:
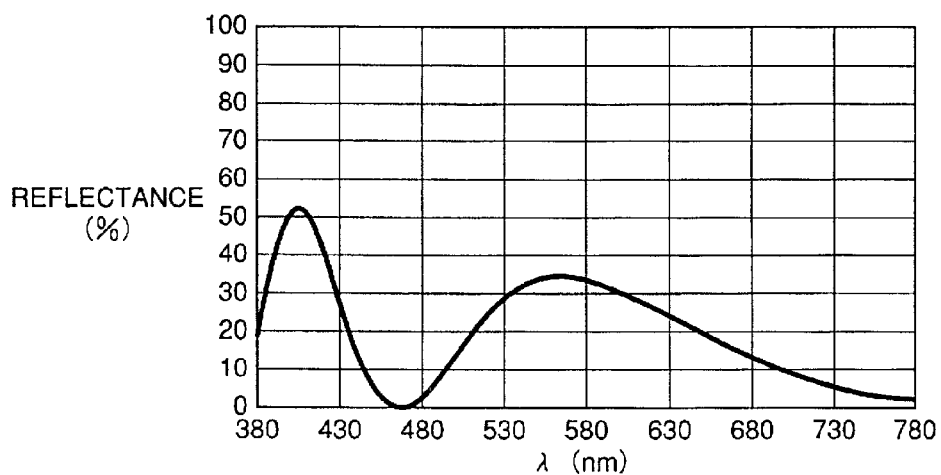
FIG. 15 is a graph showing a spectrum at $\phi=45.0°$ and in the orthogonal phase according to the fourth embodiment of the present invention.
Figure 16:
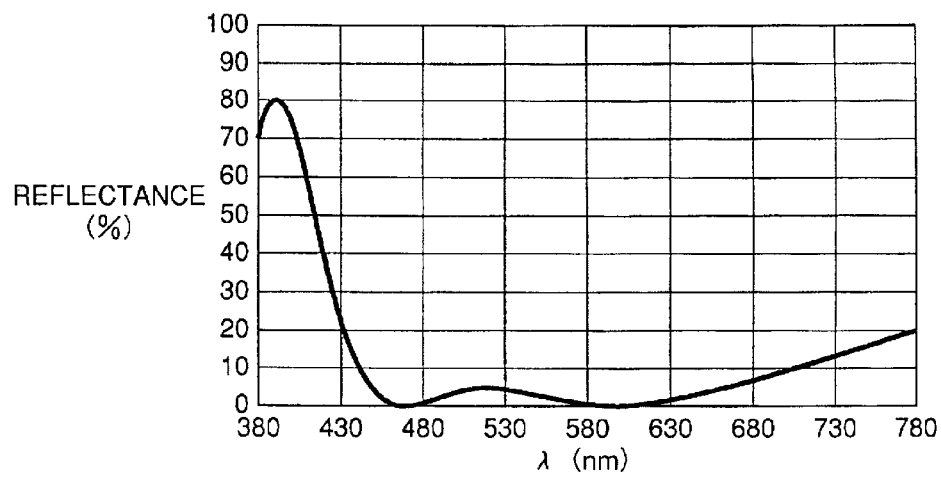
FIG. 16 is a graph showing a spectrum at $\phi=67.50$ and in the orthogonal phase according to the fourth embodiment of the present invention.

Further, though the present embodiment have used φ=45°, the angle is not limited thereto, and hence other angles can also be used. It is, however, convenient to use φ=45°, since that is when the wavelength at which the exit light intensity is 0 is most uniformly aligned and also β/π will be round figures in increments of 0.5. However, this is not applicable if two or more wavelengths at which the exit light intensity is 0 cannot be obtained in a wavelength range in which the measurement is performed. For example, if liquid crystal with a birefringent index Δn of 0.110 at the wavelength 589 nm is injected into the liquid crystal cell formed by a specular reflector of Θ=240° made by a spacer with the particle diameter of 6 μm to form a liquid crystal layer, to form an object to be measured, and the light is emitted thereto from the azimuth of Θ/2, a spectrum shown in FIG. 15 is obtained. Here, only one wavelength at which the exit light intensity is 0 can be obtained, which is insufficient for determining an approximation. In such a case, φ will be required a change. For example, φ must be selected such that at least two wavelengths at which the exit light intensity is 0 can be obtained, such as φ=67.5° as shown in FIG. 16.

Though STN type liquid crystal cell of Θ=240° has been used for the measurement in the embodiments described above, the measurement method according to the present invention is not limited in principle to Θ=240°, and hence a TN (Twisted Nematic) type liquid crystal cell with Θ=approximately 90° can be used for the measurement in a similar manner.

Fifth Embodiment

In the embodiments described above, white light such as light from a tungsten bulb is entered via a polarizer and exit light is dispersed to calculate Δn·d at a plurality of wave lengths, and Δn·d at a wavelength at which Δn is known is found from an approximate expression based on the calculated result, to obtain a cell gap d from the value of the Δn·d. Thus, the method does not necessarily measure a value of Δn·d at the wavelength at which Δn is known. However, ideally, it is advantageous to use a method in that the wavelength at which Δn is known is used to measure Δn·d, which is in turn used together with a known Δn to find a cell gap d, and thus such a method will now be described.

Considering that information about a wavelength at which Δn is known is required, there are possible methods such as a method of using a monochromatic light source with the wavelength is used as a light source, and a method of using white light as a light source so as to detect only light of a wavelength at which Δn is known using a spectroscope, an interference filter or the like. These methods enable detection of the information for a wavelength at which Δn is known.

The latter method was employed in the present embodiment. To realize the method, in the device shown in FIG. 1, a slit of spectroscope 4 is set such that only a desired wavelength can be detected, so as to allow entrance side polarizer 2 and exit side polarizer 3 to freely rotate about a rotational axis perpendicular to liquid crystal cell 101 while maintaining an angle formed by the respective transmission axes of entrance side polarizer 2 and exit side polarizer 3 to a predetermined angle, enabling detection of variation of detection intensity due to change of an angle formed by the transmission axis of entrance side polarizer 2 or exit side polarizer 3 and upper substrate side alignment direction 25 of liquid crystal, i.e. a positive direction of the x axis (hereinafter referred to as "rotational angle"). Instead of rotating entrance side polarizer 2 and exit side polarizer 3, a stage 7 on which liquid crystal cell 101 is mounted may be rotated about a rotational axis perpendicular to liquid crystal cell 101. Further, use of the monochromatic light source or a combination of the white light source and the interference filter would dispense a spectroscope, resulting in reduced cost of manufacturing, while the measurement itself being essentially the same as the method employed in the present embodiment.

Outline of the present invention will be described below based on FIG. 1.

Entrance light 8 emitted from light source 1 of a white light source passes through lens 6 and thereafter enters into liquid crystal cell 11 via entrance side polarizer 2. Exit light 9 reflected at reflector 15 to again pass through liquid crystal layer 11 is detected, via exit side polarizer 3, at spectroscope 4 in which slits are adjusted such that light with a wavelength at which Δn is known is detected.

As shown in FIG. 2, when an angle formed by entrance side polarizer transmission axis 23 and upper substrate side alignment direction 25 is assumed to be φ, and an angle formed by exit side polarizer transmission axis 24 and upper substrate side alignment direction 25 is assumed to be φ', correlation can be obtained between exit intensities of φ and φ' by the equations (a) to (c).

When φ=φ', or φ=φ'±90°, the polarizing plane-maintaining condition explained in the paragraph describing the principle of the measurement in the first embodiment can be applicable.

Figure 17:
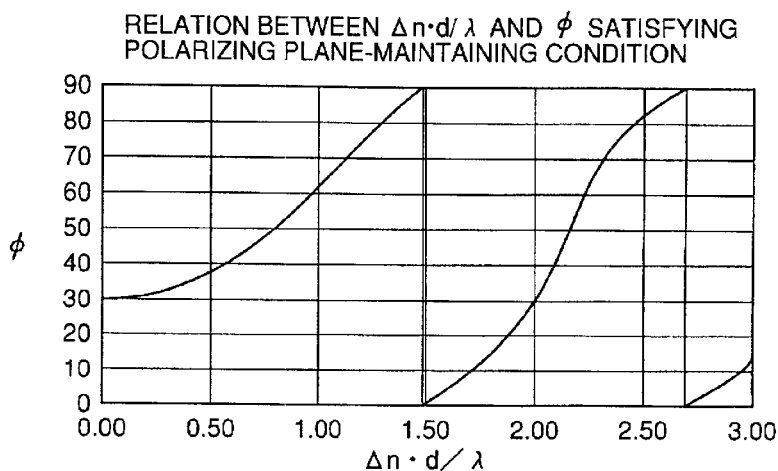
FIG. 17 is a graph showing a relation between $\Delta n \cdot d / \lambda$ and $\phi$ satisfying polarizing plane-maintaining condition according to the fifth embodiment of the present invention.

FIG. 17 shows the correlation between φ and Δn·d/λ by which maximal intensity can be obtained when entrance side polarizer 2 and exit side polarizer 3 are parallel to each other (φ=φ') and the twist angle Θ is 240°. Further, the correlation between φ and Δn·d/λ by which minimum intensity can be obtained when entrance side polarizer 2 and exit side polarizer 3 are orthogonal to each other (φ=φ'±90) and the twist angle Θ is 240° is also shown in FIG. 17. Parameters Δn·d/λ are herein indicated up to 3. The result is used to obtain a relation between measurement wavelength λ at which Δn of liquid crystal is known and Δn·d corresponding thereto, and thus cell gap d can be obtained since Δn is known.

Figure 18:
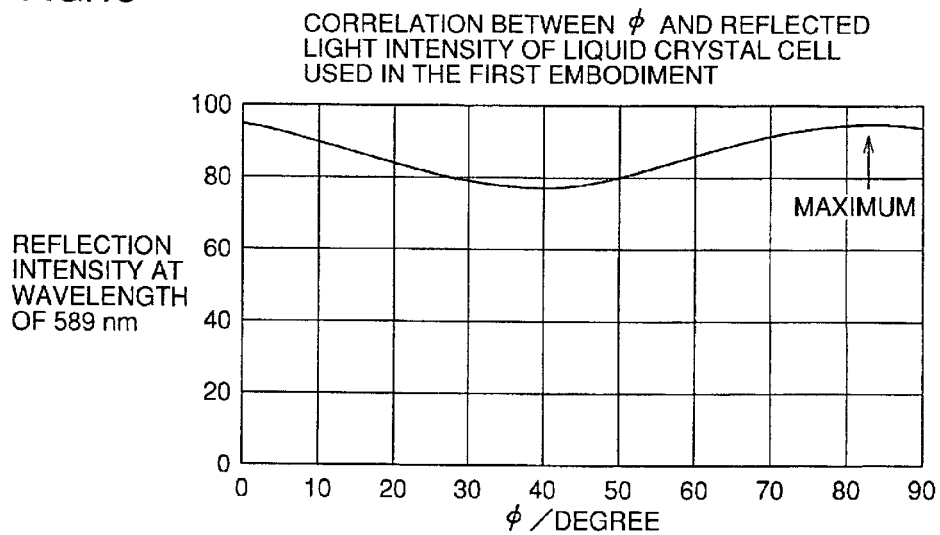
FIG. 18 is a graph showing a correlation between φ and reflected light intensity of liquid crystal cell used in the first embodiment according to the fifth embodiment of the present invention.

For example, as in the liquid crystal cell used in the first embodiment, an attempt is made with a liquid crystal cell having the twist angle Θ=240° into which liquid crystal with Δn being 0.135 at the wavelength of 589 nm is enclosed. White light is entered, with the respective transmission axes of entrance side polarizer 2 and exit side polarizer 3 arranged parallel to each other, and an angle φ formed by transmission axis 23 of entrance side polarizer 2 and upper substrate alignment direction 25 is varied maintaining the transmission axes parallel to each other, while the change of detection intensity of light with the wavelength of 589 nm corresponding to the angle φ is measured. The result is as shown in FIG. 18 in which an angle at which the maximum intensity can be obtained will be φ=83.5°. It can be found from FIG. 17 that Δn·d/λ satisfying the polarizing plane-maintaining condition at the angle φ=83.5° are 1.35 and 2.52. Because λ=589 nm, Δn·d will be 1.35×589=795.2 nm or 2.52×589=1484 nm. The latter thereof is clearly inappropriate when considered from an expected value of the cell gap, so that 795.2 nm can be employed for the value of Δn·d, and d=795.2/0.135=5.89 μm can be obtained from a known Δn=0.135.

Thus, a value approximately equal to the cell gap value of 5.90 μm obtained in the first embodiment was found. This ensures that the approximate expression in the first embodiment was accurate, and the difference between the both values would be larger if an inaccurate approximate expression was used.

Figure 19:
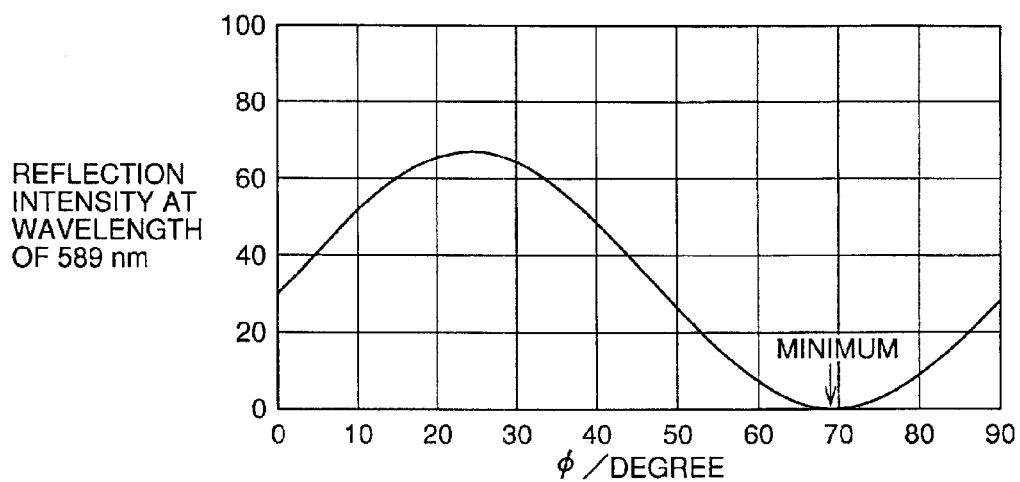
FIG. 19 is a graph showing a correlation between φ and reflected light intensity of liquid crystal cell same as the liquid crystal cell used in FIG. 15 of the fourth embodiment according to the fifth embodiment of the present invention.
Figure 20:
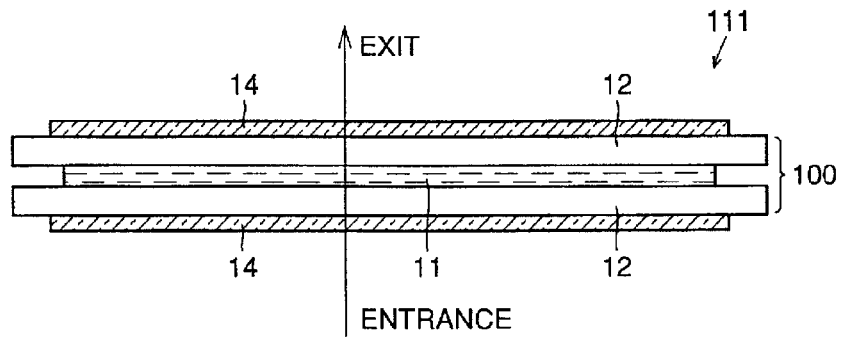
FIG. 20 is a section view of a conventional transmission-type liquid crystal display.
Figure 21:
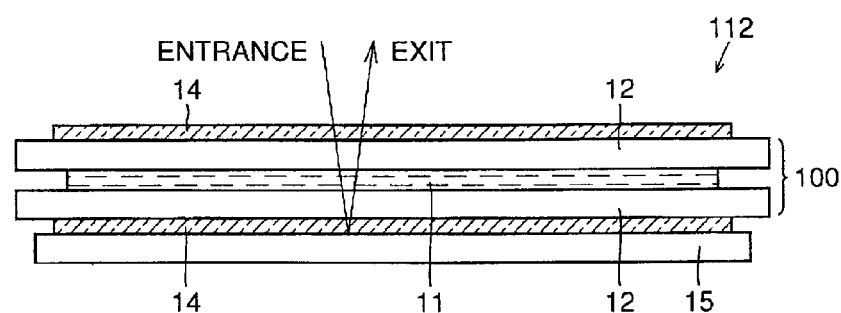
FIG. 21 is a section view of a conventional reflection-type liquid crystal display.
Figure 22:
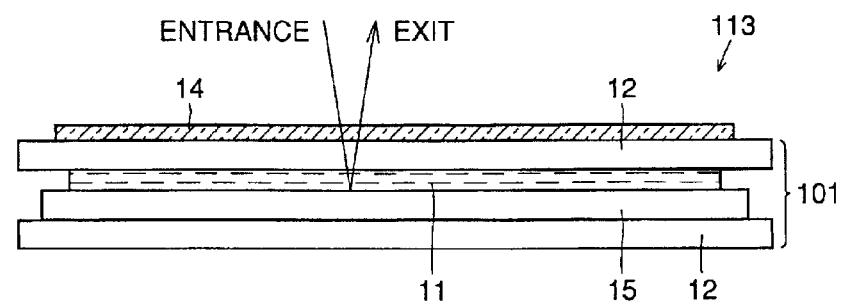
FIG. 22 is a section view of a reflection-type color liquid crystal display in which a reflector is disposed within a cell.

The condition shown in FIG. 17 is a relation between Δn·d/λ and φ that satisfies the polarizing plane-maintaining condition, so that φ, at which the minimum intensity can be obtained when the respective transmission axes of entrance side polarizer 2 and exit side polarizer 3 are arranged to be orthogonal to each other, satisfies this condition. For an example of an arrangement in that the respective transmission axes are orthogonal to each other, white light is entered, with entrance side polarizer 2 and exit side polarizer 3 arranged orthogonal to each other, into a liquid crystal cell having the twist angle Θ=240° and spacer particle diameter of 6 μm in which liquid crystal with Δn of 0.110 at the wavelength of 589 nm is enclosed, and an angle φ formed by transmission axis 23 of entrance side polarizer 2 and alignment direction 25 of liquid crystal on the entrance side is varied maintaining the transmission axes of entrance side polarizer 2 and exit side polarizer 3 orthogonal to each other, while the change of detection intensity of the light with the wavelength of 589 nm corresponding to the angle φ is measured, the result of which being shown in FIG. 19.

Here, the angle at which the minimal intensity can be obtained will be 69.4°. The value of Δn·d/λ satisfying the polarizing plane-maintaining condition at φ=69.4° can be found from FIG. 17 as 1.10 and 2.33, from which Δn·d is found to be 1.10×589=647.9 nm or 2.33×589=1372 nm. The latter thereof is clearly inappropriate, so that Δn·d at 589 nm will be 647.9 nm, and the known Δn=0.110 is assigned to obtain the cell gap d of 647.9/0.110=5.89 μm.

An advantage of the method shown in the present embodiment is that retardation at a desired wavelength, i.e. Δn·d, can be measured, such that the cell gap can be found independent of an approximate expression.

Though, in this example, the white light source was used to detect only a desired wavelength by a spectroscope, measurement may also be performed without the spectroscope if a monochromatic light source is used. For the monochromatic light source, laser, the white light source with an interference filter, or the like may be used. Any wavelengths for which Δn is defined may be used. Use of Abbe refractometer simplifies measurement of the value of Δn at a specific wavelength. Furthermore, a parallel phase measurement, in which only one polarizer is enough, can be performed only by changing the rotational angle of the one polarizer to the liquid crystal cell to find an angle at which the reflected light intensity assumes a maximal value, thereby further simplifying the device.

Moreover, depending on the value of Δn·d/λ, the change of the reflected light intensity corresponding to the change of φ may hardly be obtained. This occurs when twist angle Θ=240°, Δn·d/λ=1.4907 or 2.6874, in which case β/π happens to be an integer. In such a case, the change of the reflected light intensity to φ is buried into a measurement error and thus no value of φ providing maximum or minimum will be found. When this happens, monochromatic light with a different wavelength should preferably be used.

According to the present invention, a property of reflected light, in which the light returns maintaining the same polarizing plane as the polarizing plane at the time of entrance when a polarizing plane-maintaining condition is satisfied, can be utilized to measure a thickness of a birefringent body having a birefringent index Δn which is uniform in the thickness direction, so that it will be possible to measure the thickness of an alignment-treated liquid crystal layer included in a reflective-type liquid crystal display element that could not be measured by a conventional method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of measuring a thickness d of a liquid crystal layer having alignment-treated upper and lower surfaces and a birefringent index Δn which is uniform in the thickness direction, in a reflection-type liquid crystal display element including said liquid crystal layer between a pair of substrates and having a reflection region at least in a part of one of said substrates, comprising:

a light-receiving step of entering light from a light source into said liquid crystal layer via a first polarizing means having a transmission axis and receiving, via a second polarizing means, reflected light exited from said liquid crystal layer by reflecting at said reflection region;

a dispersing step of spectrally resolving the reflected light received by said light-receiving step to detect a relation between a wavelength λ and a reflected light intensity;

a wavelength deriving step of finding a wavelength satisfying a polarizing plane-maintaining condition in that said reflected light returns from said reflection region maintaining a same polarizing plane as a polarizing plane at the time of said light entering, in that a difference in optical path lengths between an ordinary ray and an extraordinary ray of said reflected light is a sum of an integer multiple of a wavelength and a half-wavelength, or an integer multiple of a wavelength;

Δn·d deriving step of finding a reasonable Δn·d from the wavelength found by said wavelength deriving step and a known twist angle of said liquid crystal layer to find a relation between the wavelength and Δn·d from a plurality of combinations of the wavelength and Δn·d; and a thickness deriving step of finding the thickness d of the liquid crystal layer by assigning a known combination of wavelength λ and Δn to the relation.

2. The method of measuring a thickness according to claim 1, wherein said wavelength deriving step is performed by finding a value of a wavelength at which said reflected light intensity assumes an extreme value.

3. The method of measuring a thickness according to claim 1, wherein the transmission axis of said first polarizing means and a transmission axis of said second polarizing means are orthogonal to each other.

4. The method of measuring a thickness according to claim 1, wherein the transmission axis of said first polarizing means and a transmission axis of said second polarizing means are parallel to each other.

5. The method of measuring a thickness according to claim 1, wherein when an angle formed by the transmission axis of said first polarizing means and a direction of alignment on a plane of said liquid crystal layer contacting a substrate to which said light enters is assumed to be φ, said light-receiving step, said dispersing step and said wavelength deriving step are performed for a plurality of φs in a range of 0° to 90°.

6. The method of measuring a thickness according to claim 1, wherein a Cauchy dispersion formula is used in said Δn·d deriving step.

7. The method of measuring a thickness according to claim 1, wherein said reflection region has a diffusibility and light is received by said light-receiving step at a position off a positive reflection direction corresponding to said entering.

8. The method of measuring a thickness according to claim 1, wherein a Jones matrix is used in said Δn·d deriving step.

9. The method of measuring a thickness according to claim 8, wherein in the case that $\beta/\pi$ is n or n+½ (n is an integer) when $\alpha = \Delta n \cdot d\pi/\Theta\lambda$ (equation 1) and $\beta = \Theta \cdot (1+\alpha^{1-2})^{1/2}$ (equation 2) in which Θ is a known twist angle of said liquid crystal layer, a reasonable value of $\beta/\pi$ is found from wavelength λ when a polarizing plane of the reflected light is maintained, said twist angle Θ, and said equations 1 and 2, and a relation between the wavelength and Δn·d is found by a calculation from the obtained value of $\beta/\pi$.

10. A device for measuring a thickness d of a liquid crystal layer of a device, comprising:

a light source;

a first polarizing means having a transmission axis for transmitting light from said light source;

a second polarizing means for transmitting reflected light reflected at a reflection region of the liquid crystal layer;

a light-receiving means for receiving said reflected light transmitted through said second polarizing means;

a dispersing means for spectrally resolving the reflected light received by said light-receiving means to detect a relation between a wavelength λ and a reflected light intensity;

a wavelength deriving means for finding a wavelength satisfying a polarizing plane-maintaining condition in that said reflected light returns from said liquid crystal layer maintaining a same polarizing plane as a polarizing plane at the time of said light entering said liquid crystal layer, in that a difference in optical path lengths between an ordinary ray and an extraordinary ray of said reflected light is a sum of an integer multiple of the wavelength and a half-wavelength, or an integer multiple of a wavelength;

a Δn·d deriving means for finding a reasonable Δn·d from the wavelength found by said wavelength deriving means and a known twist angle of said liquid crystal layer to find a relation between the wavelength and Δn·d from a plurality of combinations of the wavelength and Δn·d; and where Δn is the birefringent index of said liquid crystal layer and Δn·d is the product of the birefringent index and the thickness of said liquid crystal layer;

a thickness deriving means for finding d by assigning a known combination of wavelength λ and Δn to the relation.

11. The device for measuring a thickness according to claim 10, wherein said wavelength deriving means finds a value of a wavelength at which said reflected light intensity assumes an extreme value.

12. The device for measuring a thickness according to claim 10, wherein the transmission axis of said first polarizing means and a transmission axis of said second polarizing means are orthogonal to each other.

13. The device for measuring a thickness according to claim 10, wherein the transmission axis of said first polarizing means and a transmission axis of said second polarizing means are parallel to each other.

14. The device for measuring a thickness according to claim 10, wherein when an angle formed by the transmission axis of said first polarizing means and a direction of alignment on a plane of said liquid crystal layer contacting a substrate to which said light enters is assumed to be φ, said light receiving means, said dispersing means and said wavelength deriving means are used for a plurality of φs in a range of 0° to 90°.

15. The device for measuring a thickness according to claim 10, wherein said Δn·d deriving means uses a Cauchy dispersion formula.

16. The device for measuring a thickness according to claim 10, wherein said reflection region has a diffusibility and light is received by said light-receiving means at a position off a positive reflection direction corresponding to said light entering.

17. The device for measuring a thickness according to claim 10, wherein a Jones matrix is used by said Δn·d deriving means.

18. The device for measuring a thickness according to claim 17, wherein in the case that $\beta/\pi$ is n or n+½ (n is an integer) when $\alpha=\Delta n \cdot d\pi/\Theta\lambda$ (equation 1) and $\beta=\Theta \cdot (1+\alpha^2)^{1/2}$ (equation 2) in which $\Theta$ is a known twist angle of said liquid crystal layer, a reasonable value of $\beta/\pi$ is found from wavelength $\lambda$ when a polarizing plane of the reflected light is maintained, said twist angle $\Theta$, and said equations 1 and 2; and a relation between the wavelength and $\Delta n \cdot d$ is found by a calculation from the obtained value of $\beta/\pi$.

19. A method of measuring a thickness d of a liquid crystal layer having alignment-treated upper and lower surfaces and a birefringent index $\Delta n$ which is uniform in the thickness direction, in a reflection-type liquid crystal display element including said liquid crystal layer between a pair of substrates and having a reflection region at least in a part of one of said substrates, comprising:

a light-receiving step of entering light from a monochromatic light source, with a wavelength at which birefringent index $\Delta n$ of liquid crystal is known, into said liquid crystal layer via a first polarizing means and receiving, via a second polarizing means, reflected light exited from said liquid crystal layer by reflecting at said reflection region;

a rotational light-receiving step of receiving light while changing a rotational angle which is an angle formed by said first and second polarizing means and said liquid crystal layer when seen from above, maintaining an angle formed by respective transmission axes of said first polarizing means and said second polarizing means to be constant by engaging with said light receiving step concurrently with said light-receiving step;

an angle deriving step of finding said rotational angle satisfying a polarizing plane-maintaining condition in that said reflected light returns from the reflection region maintaining a same polarizing plane as a polarizing plane at the time of said light entering, in that a difference in optical path lengths between an ordinary ray and an extraordinary ray of said reflected light is a sum of an integer multiple of a wavelength and a half-wavelength, or an integer multiple of a wavelength; and a thickness deriving step of finding d from a reasonable $\Delta n \cdot d$ selected in accordance with a relation between the monochromatic wavelength and $\Delta n \cdot d$ derived from an angle found by said angle deriving step and a known twist angle of said liquid crystal layer.

20. The method of measuring a thickness according to claim 19, wherein said angle deriving step is performed by finding a value of said rotational angle at which the intensity of the light reflected from the reflection region assumes an extreme value.

21. The method of measuring a thickness to claim 19, wherein the transmission axis of said first polarizing means and the transmission axis of said second polarizing means are orthogonal to each other.

22. The method of measuring a thickness according to claim 19, wherein the transmission axis of said first polarizing means and the transmission axis of said second polarizing means are parallel to each other.

23. The method of measuring a thickness according to claim 19, wherein said reflection region has a diffusibility and light is received by said light-receiving step at a position off a positive reflection direction corresponding to said light entering.

24. The method of measuring a thickness according to claim 19, wherein a Jones matrix is used to find $\Delta n \cdot d$ in said thickness deriving step.

25. The method of measuring a thickness according to claim 24, wherein in the case that an angle formed by the transmission axis of said first polarizing means and a direction of alignment on an entrance side surface of said liquid crystal layer is assumed to be $\phi$, and that a twist angle of said liquid crystal layer is assumed to be $\Theta$, a reasonable value of $\Delta n \cdot d/\lambda$ is found from an angle $\phi$ at which a polarizing plane of said reflected light is maintained and from a known twist angle $\Theta$, to find $\Delta n \cdot d$ at a wavelength $\lambda$ from an obtained value of $\Delta n \cdot d/\lambda$.

26. A device for measuring a thickness d of a liquid crystal layer in a liquid crystal device, comprising:

a monochromatic light source;

a first polarizing means for transmitting light from said monochromatic light source to enter the liquid crystal layer;

a second polarizing means for transmitting reflected light at said liquid crystal layer to be measured;

a light-receiving means for receiving said reflected light transmitted through said second polarizing means;

a rotational light-receiving means for receiving light while changing a rotational angle which is an angle formed by said first and second polarizing means and said liquid crystal layer when seen from above, maintaining an angle formed by respective transmission axes of said first polarizing means and said second polarizing means to be constant by engaging with said light receiving means concurrently with said light-receiving means;

an angle deriving means for finding said rotational angle satisfying a polarizing plane-maintaining condition in that said reflected light returns maintaining a same polarizing plane as a polarizing plane at the time of said light entering in that a difference in optical path lengths between an ordinary ray and an extraordinary ray of said reflected light is a sum of an integer multiple of a wavelength and a half-wavelength, or an integer multiple of a wavelength;

a $\Delta n \cdot d$ deriving means for finding a relation between a wavelength $\lambda$ and $\Delta n \cdot d$ from an angle found by said angle deriving means; and a thickness deriving means for finding the thickness d by using wavelength $\lambda$ and a known birefringent index $\Delta n$ of the liquid crystal layer.

27. The device for measuring a thickness according to claim 26, wherein said angle deriving means finds a value of said rotational angle at which the intensity of the light reflected at said liquid crystal layer to be measured assumes an extreme value.

28. The device for measuring a thickness according to claim 26, wherein the transmission axis of said first polarizing means and the transmission axis of said second polarizing means are orthogonal to each other.

29. The device for measuring a thickness according to claim 26, wherein the transmission axis of said first polarizing means and the transmission axis of said second polarizing means are parallel to each other.

30. The device for measuring a thickness according to claim 26, wherein said liquid crystal device is of a reflective type and has a reflection region and wherein said reflection region has a diffusibility and light is received by said light-receiving means at a position off a positive reflection direction corresponding to said light entering.

31. The device for measuring a thickness according to claim 26, wherein a Jones matrix is used by said $\Delta n \cdot d$ deriving means.

32. The device for measuring a thickness according to claim 31, wherein in the case that an angle formed by the transmission axis of said first polarizing means and a direction of alignment on an entrance side surface of said liquid crystal layer is assumed to be φ, and that a twist angle of said liquid crystal layer is assumed to be Θ, a reasonable value of Δn·d/λ is found from an angle φ at which a polarizing plane of said reflected light is maintained and from a known twist angle Θ, to find Δn·d at a wavelength λ from an obtained value of Δn·d/λ.

* * * * *